United States Patent [19]

Philpott et al.

[11] Patent Number: 5,565,623
[45] Date of Patent: Oct. 15, 1996

[54] METHOD AND MEANS FOR MEASURING WEAR IN CONSTANT VELOCITY JOINTS

[75] Inventors: Michael L. Philpott, Seymore, Ill.; Dale R. Pankow, Cincinnati, Ohio; Douglas Vandenberg, St. Charles, Ill.; Brian P. Welcher, Logan, Utah

[73] Assignees: Aircraft Gear Corporation, Rockford; The Board of Trustees of the University of Illinois, Urbana, both of Ill.

[21] Appl. No.: 468,138

[22] Filed: Jun. 6, 1995

Related U.S. Application Data

[63] Continuation-in-part of Ser. No. 128,892, Sep. 30, 1993, abandoned.

[51] Int. Cl.$^6$ ............................ G01N 19/08; G01N 3/56; B23Q 17/20
[52] U.S. Cl. .................................................. 73/105; 73/7
[58] Field of Search .............................. 73/7, 9, 104, 105

[56] References Cited

U.S. PATENT DOCUMENTS 3,095,730  7/1963  Matheson ...................................... 73/9

FOREIGN PATENT DOCUMENTS

| 225784 | 8/1985 | Germany | 73/7 |
| 568000 | 8/1977 | U.S.S.R. | 73/7 |
| 699396 | 11/1979 | U.S.S.R. | 73/7 |
| 1298609 | 3/1987 | U.S.S.R. | 73/7 |
| 1348345 | 3/1974 | United Kingdom | 73/105 |

OTHER PUBLICATIONS

"Effect of Dimensional Factors on the Life of Rzeppa Universal Joint", SAE Transactions, Sec. 2, SAE Paper No. 850355, 1985, pp. 25–32.

*Primary Examiner*—Hezron E. Williams
*Assistant Examiner*—Daniel S. Larkin

[57] ABSTRACT

A computerized gauge for efficiently measuring surface profiles of tracks of constant velocity joints in order to detect defects in the surfaces when rebuilding CV joints. The race is mounted on a support adapted for movement along a translation axis, and a follower is biased into contact with the race along a deflection axis generally orthogonal to the translation axis. An interface ball on the follower, of a size compatible with the track when used in a CV joint, is caused to traverse the track from one end to another while a sequence of data points are recorded indicating the position of the center of the interface ball as it traverses the track. A regressive curve-fitting technique determines a best-fit curve to the set of data points, and a comparison between the data points and a best-fit curve identifies defects in the tested track.

39 Claims, 13 Drawing Sheets

METHOD AND MEANS FOR MEASURING WEAR IN CONSTANT VELOCITY JOINTS

RELATED APPLICATION

This application is a continuation-in-part of U.S. patent application Ser. No. 08/128,892, entitled "Method And Means For Measuring Wear In Constant Velocity Joints" filed Sep. 30, 1993, now abandoned.

FIELD OF THE INVENTION

This invention relates to rebuilding of constant velocity joints, and more particularly to an electronic gauge for measuring constant velocity joint wear.

BACKGROUND OF THE INVENTION

Constant velocity joints are a special class of universal joint in which the angular velocity of the output and input shafts match identically, irrespective of the angle of the joint. Such CV joints find significant application in front wheel drive automobiles, and are usually applied two per driving axle and thus four per vehicle. There are a number of relatively expensive parts which go to make up a constant velocity joint, and different ones of the parts can wear in use. At least in part because they are now so widely applied, a rebuilding industry has grown up to refurbish or rebuild worn CV joints.

The rebuilding industry, to date, has used rather subjective judgment in determining, based on an examination of the parts disassembled from a joint to be refurbished, which parts are so worn as to require scrapping, which have additional life remaining, and which might be reused with minor repair or refinishing. If incorrect decisions are made, joints can be rebuilt with defective parts, bringing on another premature failure and rebuild. The alternate is, of course, to replace parts which need not be replaced, increasing the cost of the rebuilding operation.

The typical environment for rebuilding constant velocity joints is in the nature of an automobile repair shop or machine shop, and the mechanic or technician doing the rebuilding is expected to make subjective judgments on the degree of wear based on the appearance or feel of a defect. He attempts to gauge the depth of a groove or defect to subjectively determine whether the part in question should be scrapped, refurbished or reused. With the increasing popularity of front wheel drive cars providing more and more CV joints to be rebuilt, the prospect is for more and more mechanics and technicians, many with less and less experence, making these subjective judgments with good or bad results, and usually without any correlation between the judgment they are making and the actual impact of the defect on the operation of the CV joint. The detrimental economic impact is apparent in that environment; many parts which have remaining life will be scrapped, and many CV joints will be rebuilt with parts which should have been scrapped.

SUMMARY OF THE INVENTION

In view of the foregoing, it is a general aim of the present invention to provide a gauging system, compatible with the environment of the CV joint rebuild shop, which will measure and quantify defects in certain key components of CV joints.

It is an object to provide a gauge which will provide a numerical indication of joint wear, and thus will allow an objective determination of whether a part should be scrapped, refurbished, or reused.

An object of the present invention is to provide such a gauging system which is sufficiently effective to be readily used in that it is sufficiently reliable for the environment, it is simple to use and foolproof, and will provide a reliable test of a part in a matter of seconds. Thus, an object of the invention is to provide a gauging system which not only provides quantitative information from which judgments will be made, but also provides that information in such a way that it is likely to be used by the average mechanic.

According to a specific aspect of the invention, it is an object to measure the surface of tracks in constant velocity joints with sufficient resolution to identify defects, but which does not require the input of reference information defining the expected shape of the track.

Thus, an object is to allow the gauging of an entire range of constant velocity joint parts, but without inputting a specification for the exact shape of the track being tested.

In greater detail, an object of the invention is to determine from a measurement of the track itself the actual shape of the curve of the track, then to determine deviations from that determined shape.

Operationally, this objective allows the free positioning of a part in the gauging system, without the need to locate the part with respect to fixed references, to input part numbers or curve shapes, or the like. The system simply gauges a track and then determines from the readings taken the exact shape of the track, and from that determined shape, also detects deviations or imperfections in the track.

It is a feature of the invention that both inner races and outer races of constant velocity joints can be gauged, each in a matter of seconds, to determine quantitatively whether the track has any defect which required refinishing or scrapping of the part.

Tracks of constant velocity joints are typically of complex three-dimensional shape, and it is a feature of the invention that the aspects of the track which affect its use are gauged, and others ignored, by utilizing a drive ball, of the type normally employed to ride in the track, as an interface between the gauge and the track being tested.

Thus, it is a feature of the invention that a race of a joint to be tested is loaded into the measuring apparatus, an interface ball of compatible size with the track is also associated with the apparatus, and the interface ball is used to traverse the track to provide a series of positional coordinates representing the movement of the center of the ball as it traverses the track. That set of coordinates is then processed by a regressive curve-fitting technique to fit the data points to a best fit curve, and deviations between the data points and the best fit curve are identified as defects.

Thus, an important feature of the invention is the fact that the part can be loaded into the measuring apparatus without the exercise of anything but ordinary care, and to the extent that positional references are needed, the system establishes its own during the course of the measuring operation. It is a further feature that once the part is placed in position, an automatic sequence is initiated which acquires sufficient data to characterize the track with a single pass of the ball across the track, then produces information necessary to quantitatively gauge the quality of the track just measured.

Improvements and refinements in the apparatus of the invention involve minor adjustments to the size of the interface ball, such that the interface ball, which is of a size compatible with the track under test, has its diameter adjusted slightly as a means for controlling the contact angle of the interface ball with the track under test. Thus, for example, in the case where tracks have a tendency to be worn in a position other than the normal contact points established by a drive ball (i.e., at the nominal contact angle), a slight adjustment in the size of the interface ball of compatible size, can adjust the contact point between the interface ball and the track to measure that desired point.

Other improvements and refinements involve the configuration of the interface ball to relieve a portion of the ball (i.e., remove the nose of the ball) to prevent the ball from bottoming. Other mechanical improvements include mechanisms which make the gauge more convenient for the operator to position races to be tested, and initiate measurement cycles. The regression procedure which determines the curve shape and deviations from it is also refined, by including a double regression in order to better specify the deviation of a groove from the line of the track, without the nominal track line being significantly altered by the deviation itself.

Other objects and advantages will become apparent from the following detailed description when taken in conjunction with the drawings, in which:

BRIEF DESCRIPTION OF THE DRAWINGS

FIG. 3A is a partial diagram illustrating the connection between the retract cylinder and the follower of the system of FIG. 3;

FIG. 9A is a partial flow chart illustrating a double regression procedure for the regressive curve-fitting procedure element of FIG. 9;

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 2:
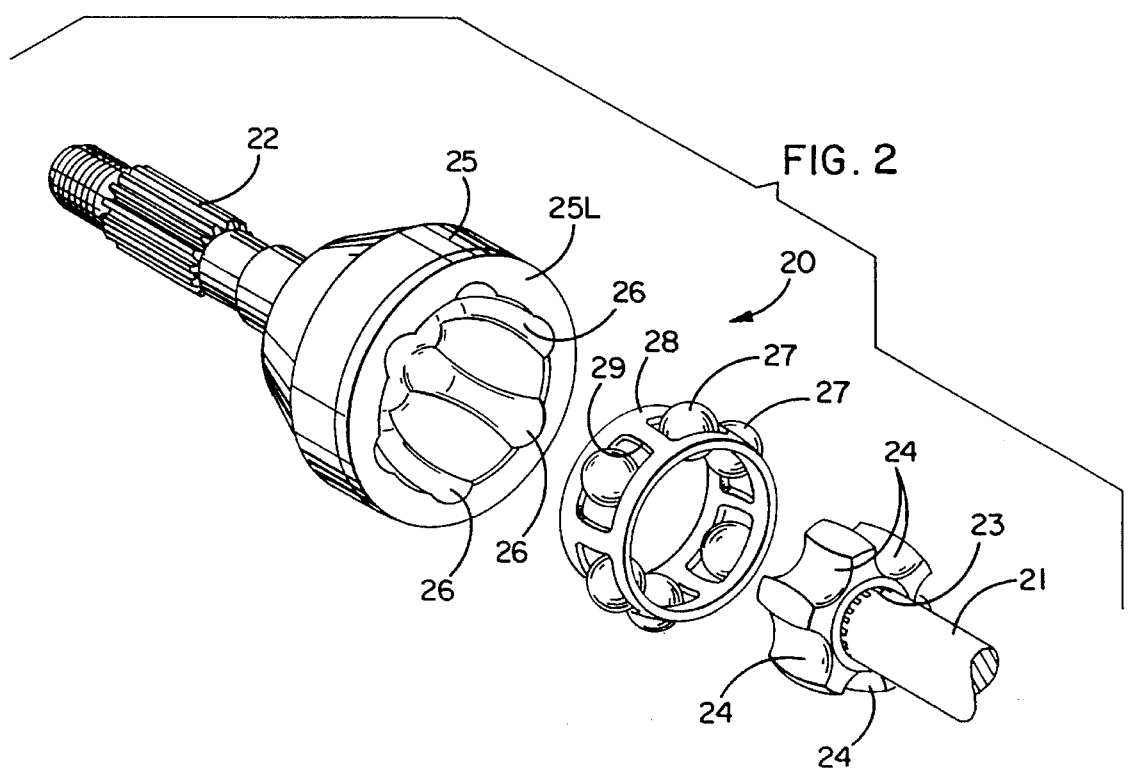
FIG. 2 is an exploded perspective diagram of a constant velocity joint of the Rzeppa type illustrating the relationship between the various components in a typical CV joint.

Turning now to the drawings, for purposes of background, FIG. 2 shows a conventional constant velocity joint of the Rzeppa type. The CV universal joint generally indicated at 20 has an input shaft 21 and an output shaft 22. A characteristic of the CV joint is that the angular velocity of the output shaft 22 always matches the angular velocity of the input shaft 21, no matter what the angle formed by the universal joint. In universal joints of the non-constant velocity type, the input and output shafts will always meet the requirement that one revolution of the former will produce one revolution of the latter, but depending on the angle of the joint, the output shaft will have localized intervals of acceleration and deceleration with respect to the velocity of the input shaft during each revolution.

The input shaft 21 is coupled as by a spline to an inner race 23 of the CV joint 20. The inner race has a plurality of axially disposed and accurately machined ball tracks 24. In the typical Rzeppa joint, six such ball tracks 24 are provided in the inner race 23. An outer race 25 has a similar plurality of ball tracks 26. A plurality of precision drive balls 27 closely fit within the respective tracks to join the inner and outer races for rotational drive but universal action. The joint also includes a ball cage 28 which is fit loosely between the inner and outer races and which has windows 29 for each of the balls 27.

In the Rzeppa joint, the cross-sectional shape of the ball grooves 24 and 26 (taken along the axis of the corresponding shaft) is circular. The circular track of the inner race 23 is offset axially with respect to the circular track of the outer race 25 such that the balls positioned in the respective tracks are urged in one direction by virtue of the offset centers of the two circular tracks. The ball cage 28 restrains the balls in the other direction. The balls very closely fit the tracks, and the two degrees of restraint, the shape of the tracks, the close-fitting nature of the balls in the tracks, all contribute to a geometry which provides a universal joint in which the angular velocity of the output shaft is exactly that of the input shaft, irrespective of the joint angle.

The shape of the track is defined not only along the axis, as just described, but also cross-wise. Typically, the shape can be elliptical, such that the ball contacts the track at only two points, often 30° apart, or in other cases, 45° apart. The cross section can also be circular such that a single point of contact at the base of the groove is normally employed.

There are forms of constant velocity ball-type joints other than the Rzeppa joint which fit the class of joints to which the present invention is applicable. The double offset joint utilizes tracks which have a straight linear profile in contrast to the circular profile of the Rzeppa joint. Cross groove constant velocity joints are also available in which the tracks may be usually of linear profile, but are not straight (i.e., parallel to the race axis) but are inclined or helical.

The point of this description is not to detail precisely the nature of constant velocity joints or the geometry by which they achieve constant velocity operation. The point is simply to illustrate the fact that there are many kinds of constant velocity joints available of the type which have grooves or tracks in an inner and outer race, with drive balls adapted to join the grooves, and configured such that a universal joint operation is provided in which the relative velocities of the input and output shaft are constant. It will also be appreciated that there are many shapes and sizes of inner races, outer races, and drive balls which join them. For example, considering the most common types of constant velocity ball joints expected to be encountered in an automotive rebuild shop, there may be approximately 12 balls needed to match the various types of joints which can be encountered. There may be 100 or more types of inner races and a similar number of outer races. The difficulty of configuring a computerized gauge which accounts for the characteristics of all such joints and joint components will now be apparent.

It is an important feature of the invention that the electronic gauge to be described in detail below is able to operate on this vast array of constant velocity joint parts to determine in a rapid and foolproof manner the surfaces of the tracks and the deviations from those surfaces, without the need to input the details of the shape encountered. In a preferred implementation, it is necessary to input to the system the fact that the part being tested has a circular track profile or a linear track profile, but beyond that the instrument is capable of determining the dimensions of the circle (for a circular track), and having made that determination, to determine not only the proper shape of the track being tested, but any deviations from the proper shape.

Figure 1:
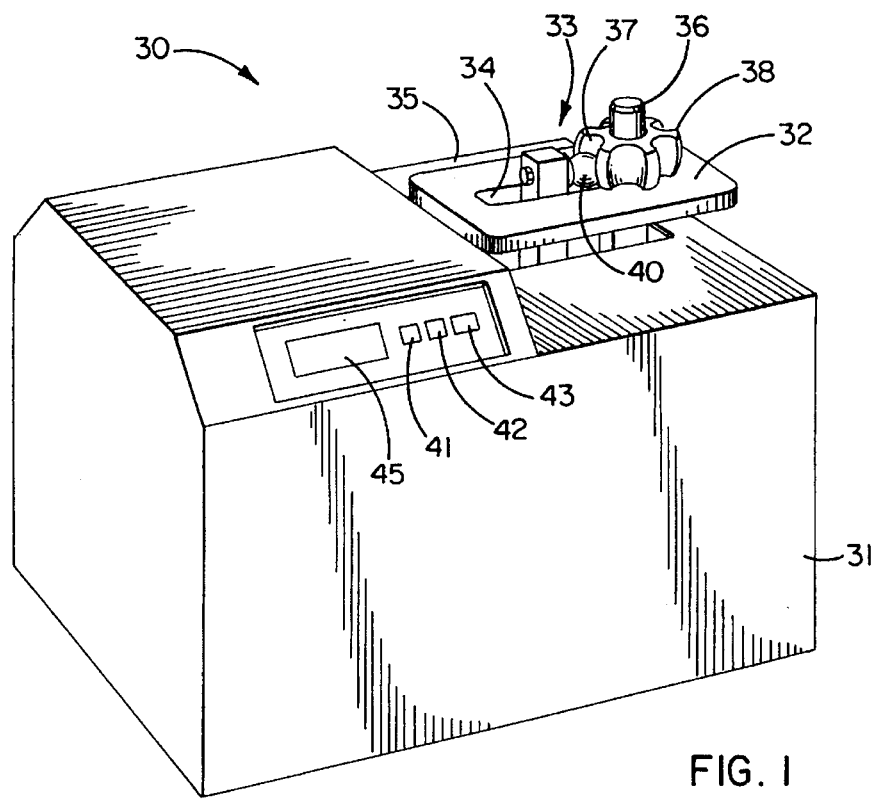
FIG. 1 is a perspective view illustrating a gauging system constructed in accordance with the present invention.

Turning then to FIG. 1, there is shown a computerized electronic wear measurement apparatus for measuring surface profiles of constant velocity joints, and determining deviations in those surface profiles. The apparatus 30 includes a protective housing 31 which covers the operating elements which need not be accessed during operation. The primary elements which need to be accessed during operation are a support table 35 and a follower mechanism generally indicated at 33.

Turning first to the support table, it will be seen that it has a generally horizontal support surface 32 which has an elongate aperture 34 formed therein to allow passage through the table of the follower. Affixed to the table 35 is a support in the form of an upstanding cylindrical post 36.

As shown in FIG. 1, the post is adapted to receive a race 38 from a constant velocity joint. As will become more apparent, the diameter of the post 36 is selected to be somewhat smaller than the diameter of the bore in the range of constant velocity joints to be tested, such that a joint can be installed on the table simply by manually placing it over the shaft. Since the system does not need to know any positional reference with respect to the constant velocity joint race being measured, and this allows simple positioning of the race on a loosely fitting shaft. Furthermore, by virtue of the fact that the follower tends to carry the race to be tested to an operative position before testing is commenced, the loose initial fit of the race on the post is accommodated.

As will be described in connection with subsequent figures, the table 35 is connected to a translation mechanism which serves to operate along a translation axis. In the illustrated embodiment, the translation axis is substantially vertical, and elements within the enclosure 31 are adapted to restrain the table for movement along the translation axis only.

The follower 33, in accordance with the invention, makes provision for an interface means which couples the follower to the track 37 of the race 38 to be tested. In accordance with the invention, the interface means is an interface ball 40 of compatible size with the track to be tested. For example, if the constant velocity joint under test is to operate with a nominal 9/16 inch ball having a design dimension of 0.5625 inches, an interface ball of approximately that size will be affixed to the follower and serve as an interface between the follower and the track to be tested.

The significance of utilizing a ball of compatible size as the interface means will be apparent when one considers the complex details of the track described above. It is possible to produce point contact measurements of the surface of the track in three dimensions, and those might yield a wealth of information. However, considering that it is desired to make the measuring system as simple and inexpensive as possible, it will be appreciated that a relatively inexpensive processor chip is to be utilized, and the computational abilities are thus limited. Utilizing an interface ball of compatible size as the interface mechanism serves not only to simplify the computational task of determining the nature of the track and any imperfections in it, but also restricts the study to the features of the track which will have an effect on its operation—those which will affect the travel of the ball of compatible size up and down the track. If the track has a defect which does not affect the travel of the ball, that defect will also likely not affect the operation of the constant velocity joint, and thus need not be addressed in the rebuilding operation. Utilizing an interface ball in the track as the interface means will isolate those defects which have an effect on ball travel, and thus will isolate those defects which will affect the operation of the joint.

The nature of the mechanism and the follower which retains the ball in position will be described in greater detail below. Suffice it to say for the moment that the ball interface 40 is retained in a fixed position in the follower 33, in the position illustrated in FIG. 1, and the follower 33 is biased so that the ball 40 contacts the track 37 in the normal manner. To accomplish that, the follower is provided with a degree of movement which is preferably limited to a single direction substantially normal to the translation axis of the table. In the simplest condition, with the follower moving in one linear direction, with the table moving in a second linear direction, and those two linear directions or axes being mutually perpendicular, a simple x-y coordinate system is established. In that situation, means are provided for measuring movement along the respective axes to produce a sequence of coordinates which can be related to the surface of the track traversed by the interface ball. The coordinates can be related to the position of the center of the interface ball, and thus to the manner in which the ball is affected by the track of the race under test. Thus, for a perfect track of circular profile, the coordinates associated with the center of the ball as the ball traverses the track from one end to the other will describe an arc of a perfect circle. While the center and radius of the circle are unknown at the time of initiating the measurement sequence, as will be described below, the coordinates are taken in such a way that a regressive analysis technique applied to those coordinates determines the shape of the circle, and thus its radius and center. Having thus determined a best fit arc to define the circular profile, the sequence which determines the shape also takes note of deviations of the travel of the ball from the perfect circular shape, and thus of imperfections in the track which have caused an unwanted deflection of the ball in its travel along the track.

Also mounted on the case are a series of pushbuttons 41–43 and a display 45. The pushbuttons include "Up" 41 and "Down" 42 scroll pushbuttons which allow the user to scroll through menus for the various programs associated with the processor contained within the housing 31. The processor utilizes the display 45 to display menus for the available sequences, and allows the user to scroll through those sequences by use of the keys 41, 42. When a particular measurement sequence, such as "measure inner race with circular profile" is selected, a "Start" pushbutton 43 is operated to cause the system to execute the selected sequence.

For example, if the sequence is selected which is adapted to measure the profile of a circular track for an inner race, (such as the race positioned on the table in the showing of FIG. 1), depression of the start pushbutton will cause the follower to move toward the race until the interface ball 40 contacts the upstanding post 36. The sequence is preferably initiated with the table at its lowermost position, such that the ball will first of all engage the top portion of the upstanding post. Translation of the table will then be initiated, such that the table moves upwardly, causing the ball 40 to ride down the post 36 toward the race 38. When the ball first engages the track 37, the force of the follower is adequate to orient the race 38 against the post 36, and the track 37 normal to the ball 40. The ball then rides from substantially one end of the track to the other, in the illustrated embodiment from top to bottom. A sequence of coordinates is recorded at very small increments as the ball traverses the track.

The display 45 on the front panel of enclosure 31 provides for output of information resulting from a test, typically an indication of the quality of the surface profile of the track. In the preferred embodiment, a number such as maximum deviation of any imperfections in the track is displayed. This will allow a simple go/no-go test for a rebuild shop. A standard can be established for all constant velocity joints, or different standards for different constant velocity joints. In any event, the standard can be numerical such that, for example, a test which reveals a track deviation of 0.0006 inches, is said to reveal a track which is defective, causing the part to be scrapped for replacement. If the test reveals a maximum deviation of say 0.0002 inches or less, the part is determined to be acceptable, and can be reused in a rebuild operation. Alternately, an arbitrary scale such as 1 to 10, with 10 perfect, could be employed.

Turning now to FIGS. 3–6, there are shown additional structural features of an electronic measuring gauge constructed in accordance with the invention. For purposes of orientation in FIG. 3, a generally vertical translation axis 50, defined by direction of translation of the table, is illustrated. Orthogonal to the translation axis 50 is illustrated a deflection axis 51 which is the axis along which the follower 33 is adapted to deflect in order to measure the surface of a track of a race.

In accordance with the invention, relative translation is provided along the translation axis such that the interface ball in the follower traverses the track under test. Such translation can be accomplished by maintaining either the table 32 or the follower 33 stationary and translating the other. When the device is configured for relatively small and lightweight CV joint components, we prefer to achieve relative translation by movement of the table along the translation axis. For heavier parts, it may be desirable to maintain the table stationary and translate the follower.

Turning then to the illustrated embodiment, and considering first the translation axis 50 and the mechanisms which are associated with it, there is shown a pneumatic cylinder 55 affixed as by a bolt 56 to a sturdy base plate 57 which serves as the main support for the system. Also affixed to the base 57 is a rigid support frame 60 attached to the base 57 as by bolts 61. The support table 35 is affixed to an upper machined flange 63 of a translatable support arm 64 which is attached by means of L-shaped bracket 65 to the piston rod 66 of the pneumatic cylinder 55. The free end of the piston rod 66 is loosely captured within the horizontal portion of bracket 65 to accommodate for slight misalignment between the cylinder 55 and the support arm 64, and also to allow the pneumatic cylinder 55 to begin moving without the danger of binding by the attached mechanism.

Figure 6:
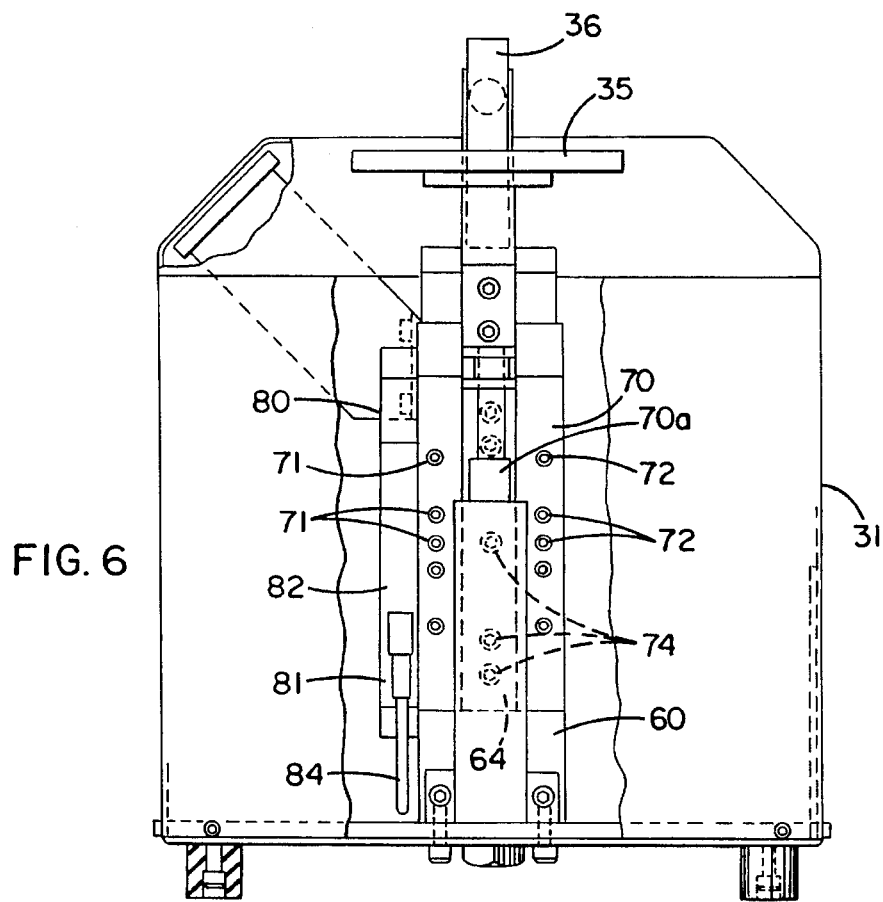
FIG. 6 is an end elevation, with a portion of the case cut away, better illustrating certain of the table elevating elements of the system.

In order to assure that the table 35 is restrained for movement along only the axis 50, and in no other direction, the support arm 64 is mounted in a precision linear bearing 70. The precision linear bearing is a commercially available device, typically a cross roller slide or a ball bearing slide, which can be purchased from suppliers such as Parker Daedel. As best shown in FIG. 6, the bearing 70 is firmly affixed by a series of bolts 71, 72 to support member 60. The bearing has a linear slide 70a affixed to the support arm 64 by a further series of bolts 74. By virtue of the arm 64 being attached to the bearing slide, and the slide itself being attached to the support 60, the arm 64 is mounted for translation along a single axis 50. The pneumatic cylinder 55 is of the dual acting variety such that it can translate the table 35 either upwardly or downwardly under the control of pneumatic control circuitry to be described below.

For measuring translation along the translation axis 50, position indicator means are provided, shown herein as a linear optical encoder 80. The encoder 80 includes an elongate housing 81 having a finely divided graticule which cooperates with a transportable light source and sensor in a second housing 82. The encoder can operate on transmission or reflection principles, but within the housing 82 is a sensor adapted to sense small increments of travel as the transportable slide 82 moves along the graticule within the housing 81. Thus, as the pneumatic cylinder 55 increments the table 35 either upwardly or downwardly, a sequence of pulses is produced on an output cable 84 which indicates the direction of travel and also increments of travel. A preferred encoder is that produced by RSF Electronics, Model No. MSA 6708. It produces a quadrature output signal which is decoded by well-known electronic circuitry to determine the direction of translation, and also to produce a sequence of count pulses (which can be summed in an accumulator) to indicate the amount of travel.

By way of an alternate, if a translation mechanism were provided which was accurately calibrated with respect to time, such as that which would be provided by a synchronous electrical motor, the encoder 80 might be dispensed with, and simple increments of time noted to determine travel along the translation axis 50. However, it is preferred to directly monitor travel by means of the disclosed optical encoder, since increments of such fineness are useful in determining the fine deviations to be detected by the present instrument.

Figure 3:
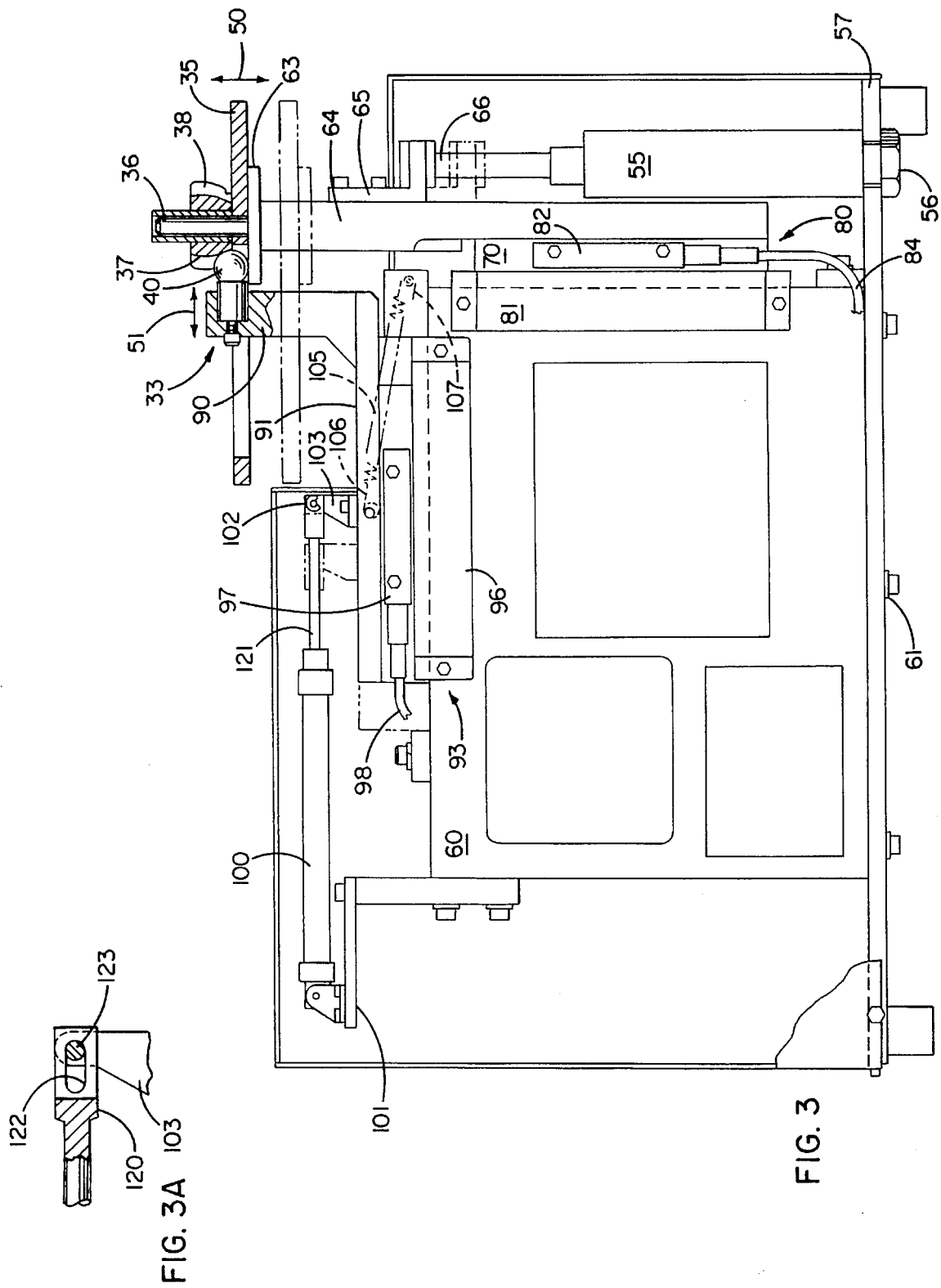
FIG. 3 is a front elevation, partly cut away, showing the operating components of the system of FIG. 2.
Figure 4:
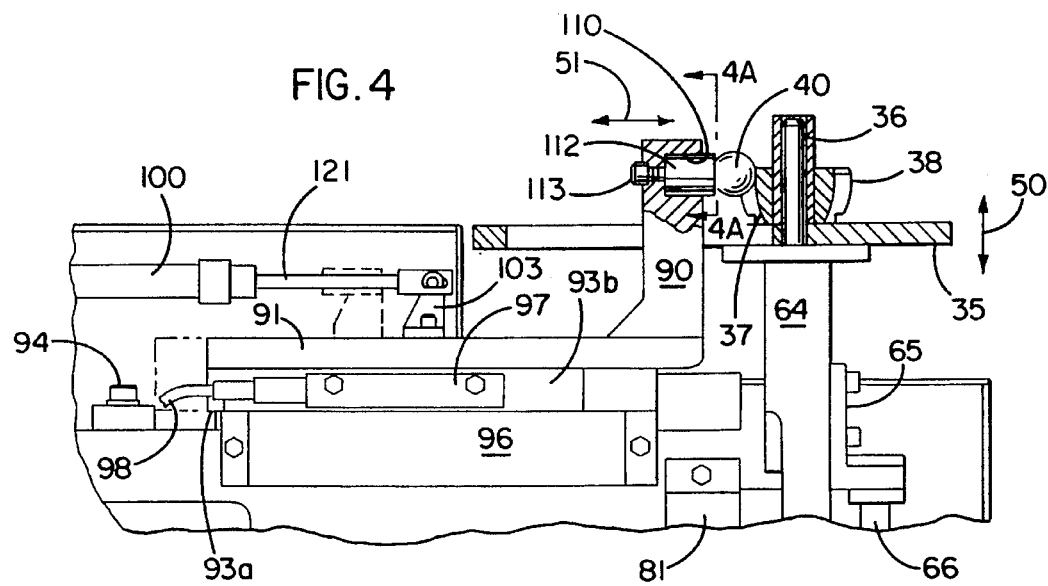
FIG. 4 is a partial diagram, in front elevation, illustrating the operation of a system in gauging an inner race of a CV joint.
Figure 5:
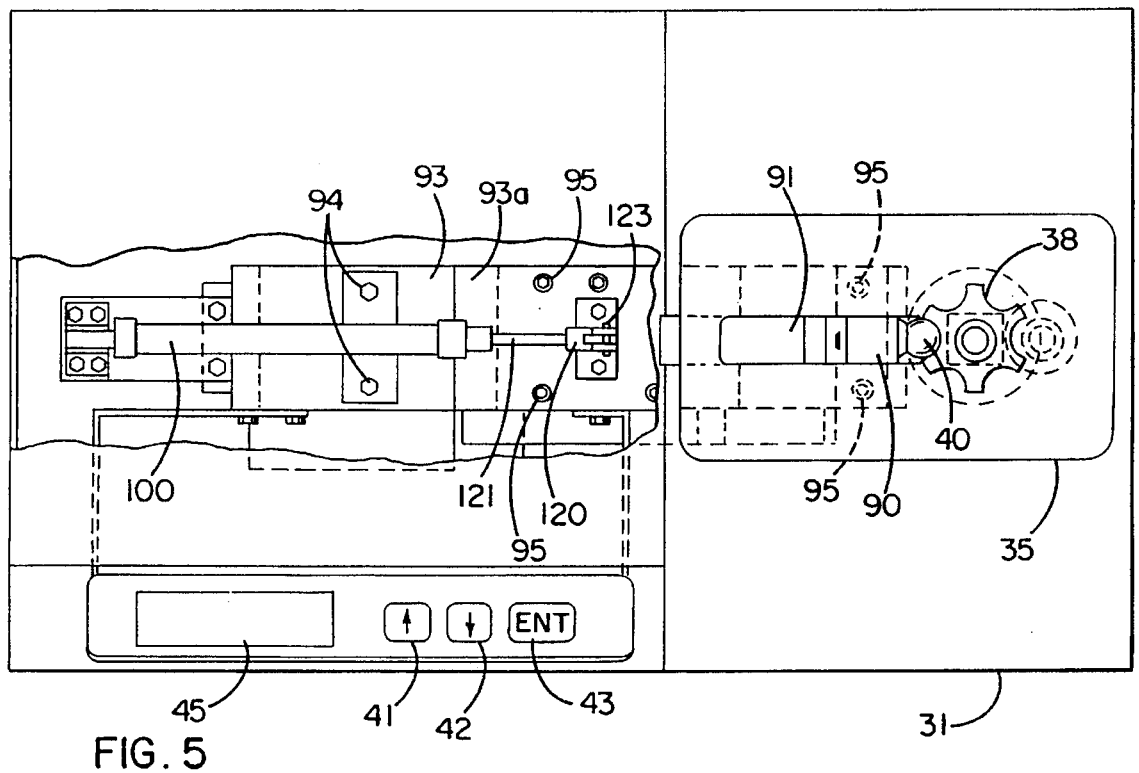
FIG. 5 is a plan view of the system in the condition shown in FIG. 4.

The details of the follower mechanism are also shown in FIGS. 3–6. It is seen that the follower, in the illustrated embodiment, includes an upstanding arm 90 which forms an extension of a horizontal arm 91. The arm 91 is mounted in a precision linear bearing 93, similar to that which mounts the table for translation. Referring particularly to FIG. 5, it is seen that the base member 93a of the bearing 93 is affixed to the support structure 60 by a series of bolts 94. The slide member 93b of the linear bearing 93 is affixed by an additional series of bolts 95 (shown in FIG. 5) to the horizontal portion of the arm 91. By virtue of tightly constraining the slide 93b within the bearing base 93a, the arm 91 is affixed to the support structure 60 (and thereby to the base 57) for movement along only the deflection axis 51. Thus, the mechanical structure described in connection with FIGS. 3–6 establishes a mutually orthogonal axis system so that a race to be tested can be translated along the translation axis 50 with the follower 33 being adapted for deflection along the orthogonal deflection axis 51. A sequence of coordinates are taken which define the path of the surface to be tested, and those coordinates are used to determine the nature of the surface and defects in it.

For determining increments of deflection along the deflection axis 51, a second optical encoder is provided. Like the encoder 81, it has a fixed graticule housing 96 associated with a movable sensor housing 97. The graticule within the housing 96 is sensed by a light source and sensor within the housing 97 to produce quadrature output signals on an output cable 98 which are interpreted by electronic circuitry to determine the direction and amount of deflection along the axis 51.

For controlling the position of the follower 33, a pneumatic cylinder 100 is fixed to the support means by a bracket mechanism generally indicated at 101, and attached at 102 to a bracket 103 which in turn is affixed to the horizontal arm 91 of the follower. In the illustrated embodiment, the pneumatic cylinder 100 is of the single-acting type and is adapted only for retraction of the follower, permitting loading of a new piece. A spring 105 pinned to the horizontal arm 91 at 106 and to the fixed support 60 at 107 is adapted to bias the follower toward the translation axis 50. Thus, when a measurement sequence is desired, the pneumatic pressure on cylinder 100 is released, and the spring 105 draws the follower into contact with the part to be tested.

In accordance with an important aspect of the invention, mechanical interface means are provided between the follower arm 33 and a race 38 to be tested. As noted earlier, constant velocity joints are designed to utilize drive balls 27 of precise design size to closely fit the profiles of the tracks 37 in the race 38. In accordance with the invention, an interface ball 40 of compatible size with the race 38 is utilized as an interface means between the follower 33 and the race 38 under test. As will be described in greater detail below, the system is adapted to seat the race 38 against the post 36 such that the ball 40 engages the track 37 in its normal and ordinary attitude. This travel of the interface ball is very much like a drive ball would experience in traveling along the track 37 as the joint is bent from one extreme angle to an opposite extreme. Any deviations in the track 37 which are sensed by the ball 40 acting as an interface, will also be encountered in normal operation of the constant velocity joint. Thus, in accordance with the invention, the system of FIG. 3 monitors the center of the ball 40 (by way of monitoring the position of the follower 33) in order to derive a set of rectilinear coordinates which are then used to determine the shape of the track and determine any deviations in it.

Figure 4A:
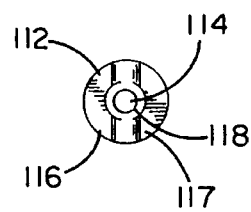
FIG. 4A is a partial diagram taken along the line 4A—4A of FIG. 4 showing the ball-holding magnet.

In one embodiment, for purposes of affixing the interface ball 40 to the follower 33 in an operative position, and allowing ready interchange of balls of different sizes, a magnetic securing means is provided. As best shown in FIG. 4, the upper portion of the arm 90 has a cylindrical socket 110 formed therein. Captured within the socket is a commercially available high grade magnet, such as an Alnico magnet 112 which is affixed in the socket 110 such as by a bolt 113 through the center thereof. The magnet 112, as best shown in FIG. 4a, in addition to a central aperture 114 for receiving the bolt 113, has a pair of arcuate pole pieces 116, 117 having a circular aperture 118 centered therebetween. The aperture 118 is of a size adapted to capture balls of the entire range of sizes utilized with the instrument. The magnet is sufficiently strong that a ball positioned near the poles 116, 117 is drawn into the aperture 118 to seat very securely in the center of the magnet. The force holding the ball in position is sufficiently great to cause the ball to stay rigidly in position in the magnet even as the follower cycles through a measuring traverse which can include a discontinuity in riding from the vertical surface of the post 36 onto the track. When it is desired to measure a race of a different size requiring a different size ball 40, simple hand manipulation removes the ball 40 from its centered position within the magnet 112 and allows replacement of another ball of size compatible with the race to be measured.

One further feature of the follower mechanism, noted briefly above, is the fact that the spring 105 biases the follower toward the track to be measured. In doing so, means are provided to free the follower from the mass of the retract cylinder 100. Turning to FIG. 3a, it is seen that a fitting 120 is provided at the end of the rod 121 of the cylinder 100, and the fitting has an elongate slot 122 formed therein. A pin 123 in the bracket 103 is adapted to freely ride forward or backward in the slot 122. Thus, when a measurement sequence is to begin, the pneumatic pressure on the cylinder 100 is released, and the spring 105 draws the follower to bring the ball 40 into contact with the post 36. The translation cylinder 55 then begins to raise the table, following which the ball engages the track as best illustrated in FIG. 4. When the follower is moved to the left along the axis 51 by engagement with the track, the pin 122 causes the cylinder 120 to retract slightly. However, when the follower then advances to the right along the axis 51, the fact that the pin 123 is free within the slot 122 will allow the follower mechanism to closely follow the changes in the track which bring the follower to the right, without the necessity for pulling along the retract cylinder 100. Thus, the retract cylinder 100 is rendered incapable of detrimentally affecting deflection measurements taken by the follower 33 during normal operation. As a result, the sensitivity of the device is not compromised even though there is a certain mass associated with the elements needed to retract the follower, that mass in effect being decoupled during the measurement sequence.

Figure 7:
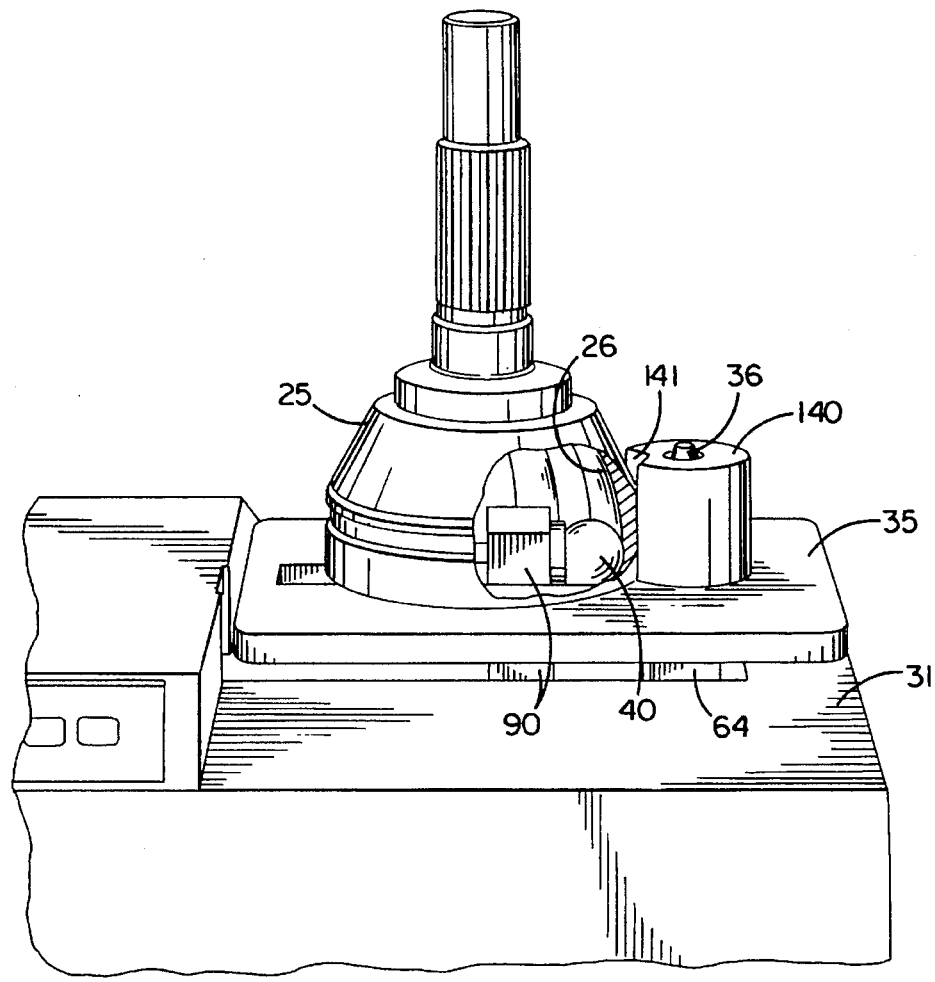
FIG. 7 is a partial diagram illustrating use of the system with an outer race having internal tracks.

It was noted at the outset that constant velocity joints include not only inner races of the type which have been described in connection with the invention thus far, but also outer races having ball receiving tracks on the interior thereof. The instrument described thus far is also adapted to measure such tracks to detect deviations. Referring to FIG. 7, a V-block 140 is provided to fit over the upstanding post 36 and provide a V-shaped slot 141 for positioning an outer race 25 of a constant velocity joint to be tested. Preferably, the V-block 140 is located on the post with the base of the V centered on the deflection axis of the follower, and is locked by means (not shown) to prevent rotation of the V-block 140 about the shaft 36. The race is positioned by hand against the V-slot 141. The upstanding offset 90 of the follower arm allows the interface ball 40 carried by the follower arm to project inside the cylindrical opening normally occupied by the inner race. Translation of the table from one end to the other will then cause the ball 40 to traverse the track 26 from one end to the other, providing a measure of the surface profile of the track and any deviations therein. Whereas measurements of the inner race are preferred to be accomplished with the table starting the sequence at its lowermost position, then raising to its uppermost position, causing the ball to ride across the track 37 from top to bottom, when measuring outer races 25 it is preferred to operate in just the opposite manner. Thus, it is preferred to cycle table 35 to its uppermost condition in which the ball 40 is at the base of the track 26, then to cause the table 35 to move along the translation axis 50 in a downward direction, causing the ball 40 to traverse the track 26 from bottom to top. It is also desirable to determine, preferably from the shape of the track, the point at which the ball has reached the top of the track, so that translation of the table can be halted before the top of the arm 90 contacts the inside of the housing.

It was noted above that there are over 100 types of races which might be tested on an instrument built according to the present invention. One aspect of the invention tending to assure that such a large number of parts of different shapes and sizes can be readily tested, is the ability to readily switch from one part to another. As will be described below, the techniques by which the shape of the track is determined allow that determination to be made without the necessity for locating the race to be tested with respect to any given axis, or even of inputting any information on the parameters defining the curvature of the race. Thus, in the preferred embodiment, the upstanding post 36 which receives the race 38 is dimensioned to allow the race to be easily slid over the post, without the need for a press fit or the like. When the follower 33 is then moved toward the support 36 and engages the track, the spring 105 is provided with sufficient force to cause the ball 40, once it engages the track 37, to translate the race against the post, so that the measurements are taken with respect to a race fixed in position with respect to the post. It is only important that the race not move during traverse of the ball from one end to the other, not that the race be in any particular location with respect to a reference surface. The race must be fixed, and the interface ball must engage the track in the normal manner in which it would engage the track in the normal operative condition of the CV joint. The fact that the race is positioned approximately correctly by hand when it is placed on the table 35, and the fact that the spring 105 has sufficient force to achieve any minor corrections, causes the race to be driven to the fixed stop and the ball to engage the track in the normal manner, so that measurements of the ball center as the ball traverses the track are a reliable measure of the surface characteristics of the track.

Naturally when installing a heavier piece, such as an outer race as illustrated in FIG. 7, greater care must be taken to position the race, since the spring is less likely to be able to achieve any significant movement of the part. However, so long as the track is in normal position with respect to the interface ball, a position which can be readily achieved by reasonably careful positioning of the race, and so long as the race does not move during traverse of the ball from one end of the track to the other, reliable measurements can be taken.

Figure 4B:
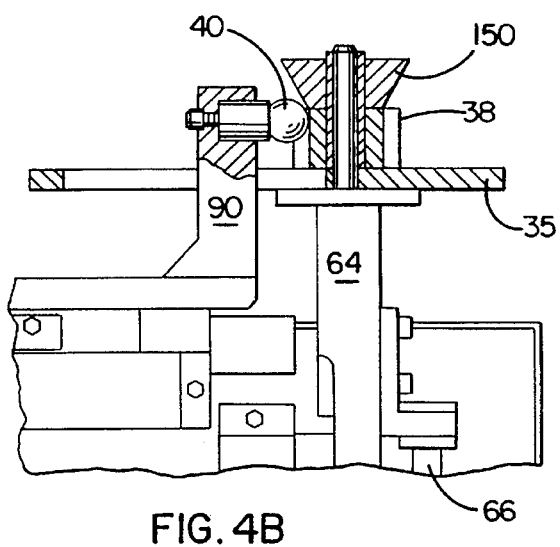
FIGS. 4B and 4C are partial views similar to a portion of FIG. 4 showing an alternative support for a race to be tested.
Figure 4C:
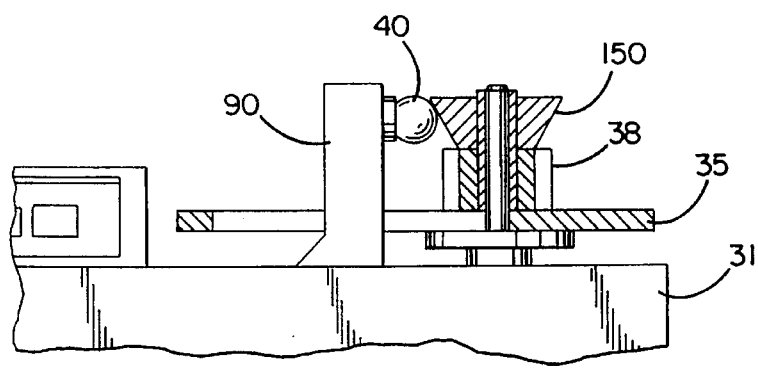

The ability of the race to loosely fit the support is also used to advantage when measuring joints of the cross groove type. The tracks in a cross groove joint have a linear profile, but they are not straight; they are inclined or helical. Thus, with the follower constrained for movement along only the deflection axis 51, and the translation mechanism constrained for movement along only the translation axis 50, it is necessary for the race to rotate on the post 36 as the ball progresses from one end of the track to the other, in order to accommodate the incline or helix of the track. The loose fit of the race on the supporting post 36 allows that rotation while still retaining the race in a position which is fixed with respect to the apparatus to a sufficient degree to allow accurate measurements. In some cases, the spline teeth on the interior of the race may create a noise in the measurements, and in order to avoid that, it has been found useful to use a tapered holding block 150 as illustrated in FIGS. 4B and 4C. The tapered holding block provides a uniform linear contact about which the race 38 can rotate without creating bumps or discontinuities such as might be created by a long series of spline teeth moving across the tangent of a portion of the upstanding shaft 36.

The tapered holding block 150 is also of use in determining the point at which the follower first contacts the track surface. Thus, it is convenient to cause the control circuitry to sense follower position as the translation of the table commences to detect a change in movement from one type to another. When using the circular cross section race, for example, the ball is allowed to traverse the vertical portion of the post 36, and the control circuitry determines, from the series of coordinates being input, the transition from the linear progression as the ball traverses the straight vertical post to the circular progression as the ball begins to move along the contour of the circular profile track. When utilized with track of a straight line or character, it is useful to have a lead-in shape which is other than a straight vertical line. In that case, a tapered holding block 150 is useful, and the control system will detect the transition from the tapered travel of the follower as it moves along the surface of the tapered holding block (FIG. 4C) to a straight line vertical taper as the ball moves along the straight line surface of the track under test (FIG. 4B).

The ability of the system to determine the type of surface the ball is following as the ball is traveling along a track is of use for a number of purposes. Transitions between tapered, vertical and curved surfaces are used as described above to determine the start or finish of ball travel along the track. It is also of use to determine the high point of an arc of a circular track, i.e., the point at which the follower has reached the center of the arc, particularly in measuring outer races, such as illustrated in FIG. 7. Thus, the system continuously monitors the travel of the ball to determine the point at which the ball has reached the center of the arc, in other words has traveled across approximately half the length of the track. The vertical travel of the ball in reaching that point is then determined, and the processor allows the traverse to continue for a total travel which is twice the measured travel. Thus, travel will be terminated at about the point the ball has traversed the entire track, but before additional traverse causes an interference between the follower arm and the internal portion of the hub of the outer race. In other situations, a maximum travel might be input whenever an outer race is being measured, and travel will be discontinued at that point. A maximum travel distance will be selected to assure that the necessary part of the track is traversed by the ball, but without the danger of the follower mechanism interfering with the inside of the housing, potentially causing damage to the mechanism.

Figure 8:
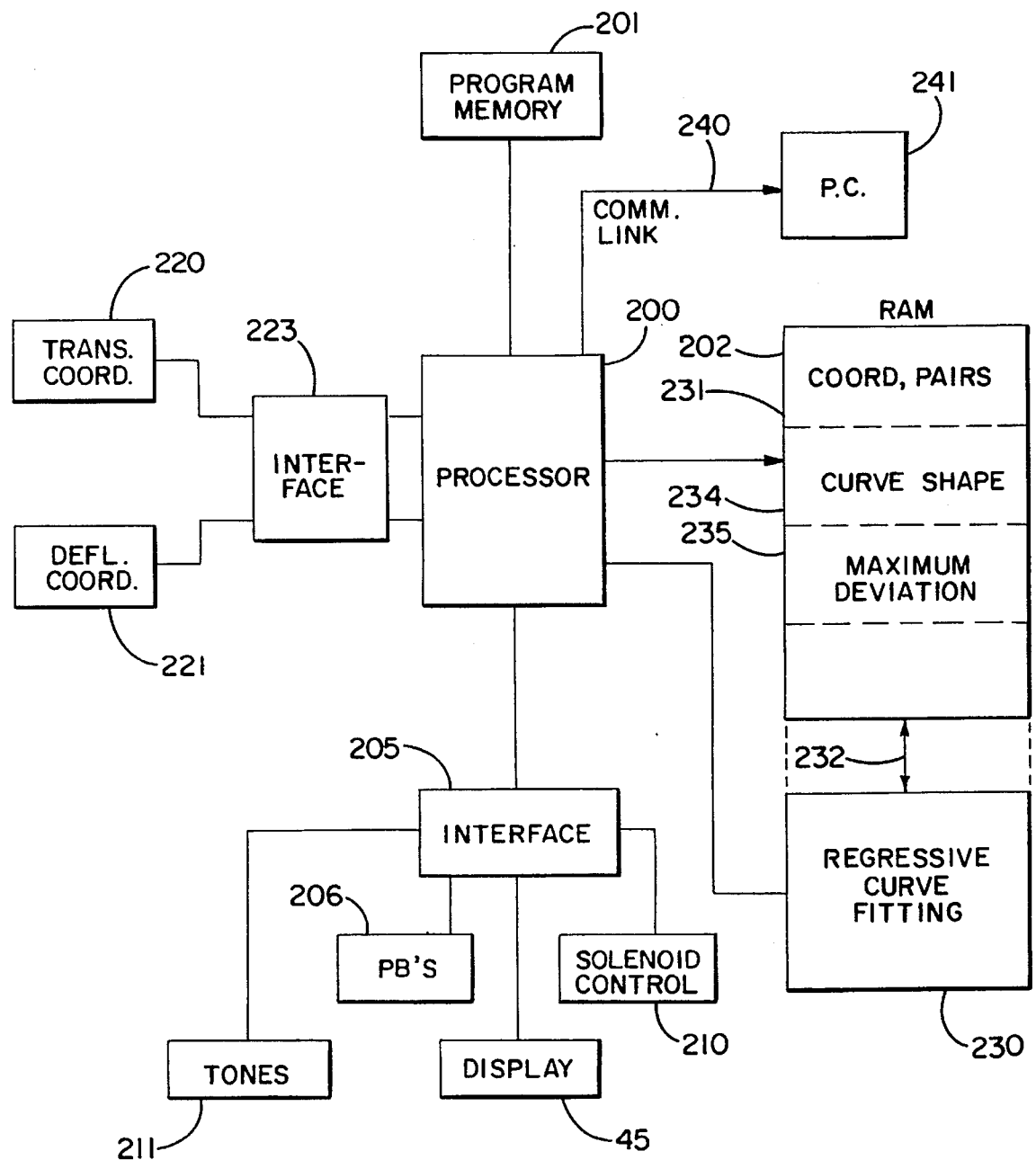
FIG. 8 is a block diagram illustrating the functional relationship between the electronic control and measurement elements of the system according to the invention.

Turning now to FIG. 8, there is shown the interrelationship between the electronic and electromechanical elements of the system according to the invention. The system is based on a central processor 200. Preferably, a commercially available single-board computer, such as the Little Giant produced by Z-World Engineering is utilized, for ease of programmability and also for affordability. The system has a Z-180 microprocessor with a 9.126 Mhz. clock. It is associated on the single board with an EEPROM which serves as program memory 201, and temporary storage 202 in the form of RAM. The processor has coupled to its output bus an interface circuit 205 which is adapted to provide interfacing between the processor 200 and the outside world. The interface circuit 205 is an element of the commercially available Little Giant single-board computer. Thus, the pushbuttons 41–43 (see FIG. 1) are illustrated as block 206 in FIG. 8 and are interfaced to the processor 200 by means of the interface circuit 205. Similarly, the display 45 is driven by the processor 200 by way of the interface 205. Solenoids are associated with the pneumatic cylinders 55 and 100, and the solenoid control and drivers are represented by the block 210 of FIG. 8. Thus, the processor 200 has the ability to cause the retraction or advancement of the respective cylinders by operating through interface 205 on the solenoid control elements 210. Preferably, the system is provided with a tone output intended as an audible signal. A tone generator is illustrated at 211 and is operated through the interface 205 by the processor 200.

As described above, the sets of coordinates determined during traverse of the interface ball 40 along the track 37 are preferably determined by linear digital encoders. Alternatively, analog encoders, rotary or linear, with an appropriate analog-to-digital converter, can be used. In FIG. 8, the position indicators are represented by the blocks 220, 221. The block 220 produces signals indicating movement along the translation axis. Deflection of the follower, in direction and amount, is indicated by similar signals produced by the block 221. An interface 223 is interposed between the coordinate transducers 220, 221 and the processor 200. The interface 223 accepts the quadrature signals produced by the transducers 220, 221 and produces output signals in the form of a series of pulses along with a signal indicating direction of travel of the associated transducer. The pulses are totalized by the processor (using the direction signals as positive or negative indicators for the totalization). Thus, the pulses produced by the transducers 220, 221 and interpreted by the interface 223 are counted by the processor 200 as a measure of translation or deflection along the translation 50 or deflection 51 axes, respectively.

It will be noted as an aside that it is entirely possible to configure a set of coordinates for the system which are somewhat different than the rectilinear set of the preferred embodiment. For example, the follower 33 might be configured to operate by pivoting rather than by translation, and the deflection coordinates 221 will then be a set of angles relating to the deflection of the follower about a known center.

In any event, the elements 220, 221 are intended to provide a sequence of coordinates relating to the center of the interface ball 40 as it traverses the track from one end to the other. The processor 200 accepts those pairs of coordinates and transfers them for temporary storage in the RAM 202. A regressive curve-fitting technique, which will be described below, operates on the coordinates in a single non-iterative process in order to determine the shape of the track traversed by the ball. A second non-iterative regressive curve fitting process can be employed to reduce the effect of defects on the track profile determined by the regressive curve fitting. These techniques are adapted to utilize the coordinates in non-iterative calculations, so that the determination of the curve shape can be accomplished in real time, and without the need for a more complex processor than the Z-180 which is utilized in the preferred implementation. The extent to which the regressive curve-fitting technique provides a measure of the shape of the curve in a rapid fashion, without undue computational cumbersomeness, and without the need for starting with a set of known coordinates is believed to be a significant feature of the invention.

Thus, as the coordinate pairs are generated they are passed through the processor 200 to be stored in a section 231 of RAM 202. The coordinate pairs are then available for regressive curve fitting under control of the processor 200 operating with a section 230 of the RAM 202. The arrow 232 indicates that the coordinates are passed to the regressive curve-fitting procedure, and the best fit curve then stored in the section 234 of RAM labeled "curve shape". After the curve shape is determined, the maximum deviations from the determined shape are obtained by comparing the determined curve with the original coordinates stored in section 231 of RAM 202. The maximum deviations, which are used as a measure of the surface profile of the track, are stored in section 235. The maximum deviation stored in location 235, after completion of a set of measurements, is then available to the processor 200 which operates through the interface 205 and display 45 to show the result. Thus, at the conclusion of a measurement, a number is immediately available to show the deepest groove in the track, and the operator will immediately be in a position to determine if the race he has tested is fit for reuse or should be scrapped.

It was noted above that the majority of constant velocity joint parts will have either linear tracks or circular tracks, and thus the regressive curve-fitting technique is adapted to fit the coordinates to either a linear or a circular form. It is preferred to utilize two separate menu driven programs, with menu titles shown on display 45, individually selectable by the operator using pushbuttons 206, to select either a linear or a circular form. Thus, when the operator places a race on the table for measurement, he must also select from the menu of available options whether a linear or a circular race is being tested. No other information about the track under test need be input. Thus, the system need not be informed, for a circular part, of the size of the radius. Nor does the circular race need to be indexed to a position with the center of the circular arc in any given orientation with respect to a fixed origin. All that is necessary is to orient the race 38 against the post 36 so that (a) the interface ball encounters the track in the normal orientation, and (b) the race does not move during the measurement. All the other determinations as to the shape of the curve are made by the regressive curve-fitting technique now to be described. In effect, the surface of the track is examined by measuring the deflection of an interface ball as the ball traverses the track under test.

At the start of a measurement sequence, the follower is indexed toward the support post 36, and once it engages the post, translation of the table is commenced. A series of coordinates at rather fine increments are recorded, and those, in effect, record the x and y coordinates for the center of the interface ball as it moves from one end of the measurement sequence to the other. During a portion of that movement, the ball will be riding in the track, and it is that portion of the measurement to which the following is directed. It has been noted above that it is relatively straightforward to detect the change from tapered to straight or straight to curved movement as a mechanism for determining the commencement of travel of the ball along the track.

Assuming that a circular race is being measured, the following derivation will provide the equations which are utilized for the regressive curve-fitting technique to fit a set of coordinates to a particular curve. For the circular race, the equation of the best fit circle is determined. The deviations, or the profile departures, from this best fit circle which is the reference surface, characterize the wear. To achieve a rapid determination of the best fit circle utilizing the low-cost single-board microcomputer technology, a non-iterative fitting technique is employed. A single step, non-iterative "circular regression" sequence is utilized. The general equation of a circle is:

$$(x-h)^2+(y-k)^2=r^2 \tag{1}$$

Assume n points $(x_i, y_i)$, where i=1, 2, 3, ..., n, are known. For each point, the error can be represented by:

$$\text{Error}=E_i=(x_i-h)^2+(y_i-k)^2-r^2 \tag{2}$$

and the sum of squares of the errors (SSE) is given by:

$$SSE = \sum_{i=1}^{n} [(x_i-h)^2 + (y_i-k)^2 - r^2]^2 = \sum_{i=1}^{n} [E_i]^2 \tag{3}$$

A best-fit circle relates to the set (h, k, r) which minimizes the sum of squares of the errors. This definition of "best-fit" is sometimes referred to as the "least-squares" fit. The partial differentials of the sum of squares of the errors with respect to h, k, and r are derived and set equal to zero to find their values which minimize the SSE.

$$\frac{\delta SSE}{\delta r} = \sum_{i=1}^{n} -4rE_i = -4r\sum_{i=1}^{n} E_i = 0 \text{ or } \sum_{i=1}^{n} E_i = 0 \tag{4}$$

$$\frac{\delta SSE}{\delta h} = \sum_{i=1}^{n} 4(x_i-h)E_i = \sum_{i=1}^{n} E_i x_i - h\sum_{i=1}^{n} E_i = 0 \tag{5}$$

or from (4) $\sum_{i=1}^{n} E_i x_i = 0$ $$\frac{\delta SSE}{\delta k} = \sum_{i=1}^{n} 4(y_i-k)E_i = \sum_{i=1}^{n} E_i y_i - k\sum_{i=1}^{n} E_i = 0 \tag{6}$$

or from (5) $\sum_{i=1}^{n} E_i y_i = 0$

The above three equations have three unknowns and are therefore solvable. They are rewritten below in long form where all sums are from i=1 to n.

$$\Sigma x^2 \Sigma y^2 - 2h\Sigma x - 2k\Sigma y + (h^2+k^2-r^2)n=0 \tag{7}$$

$$\Sigma x^3 + \Sigma xy^2 - 2h\Sigma x^2 - 2k\Sigma xy + (h^2+k^2-r^2)\Sigma x=0 \tag{8}$$

$$\Sigma y^3 + \Sigma yx^2 - 2k\Sigma y^2 - 2h\Sigma xy + (h^2+k^2-r^2)\Sigma y=0 \tag{9}$$

These three equations are manipulated so that h, k, and r can be solved without any iterative techniques. The final equations are:

$$k = \frac{(n\Sigma xy - \Sigma x\Sigma y)(\Sigma x\Sigma x^2 + \Sigma x\Sigma y^2 - n\Sigma x^3 - n\Sigma xy^2) +}{[(\Sigma x)^2 - n\Sigma x^2](\Sigma x^2\Sigma y + \Sigma x\Sigma y^2 - n\Sigma xy^2 - n\Sigma y^3)}{(\Sigma x\Sigma y - n\Sigma xy)(2n\Sigma xy - 2\Sigma x\Sigma y) - [(\Sigma x)^2 - n\Sigma x^2][2n\Sigma x^2 - 2(\Sigma y)^2]} \tag{10}$$

$$h = \frac{2(n\Sigma xy - \Sigma x\Sigma y)k + \Sigma x\Sigma x^2 + \Sigma x\Sigma y^2 - n\Sigma x^3 - n\Sigma y^3}{2[(\Sigma x)^2 - n\Sigma x^2]} \tag{11}$$

$$r = \sqrt{h^2 + k^2 - \left(\frac{2\Sigma x}{n}\right)h - \left(\frac{2\Sigma y}{n}\right)k + \frac{\Sigma x^2}{n} + \frac{\Sigma y^2}{n}} \tag{12}$$

These three equations require only a simple loop to perform summing and then, can be solved easily. The solution, i.e., best fit values for h, k and r, define, using the general form Equation (1), the equation for the circle which conforms to the track which produced the coordinates. In effect, a circular regression is performed which reduces the data into deviations about a reference surface, and minimizes the deviations in a least squares sense.

After the curve shape is determined, the original coordinates are compared with points on the curve to identify deviations. For each data point, the values of h and k are subtracted from the x and y values respectively, so that the points are referenced to an origin which is the center of the best-fit circle. These modified (x, y) values are squared, summed, and square-rooted to find the empirical radius to each point. The best-fit radius, r, value is subtracted from this empirical radius to find the radius error or deviation for that point. A running-average digital smoothing filter of 4 sample length is employed to reduce the effect of spurious noise, giving a set of radius errors $R_{av}(y_i)$ for each race track. The maximum positive radius error $R_{av}(y_i)_{max}$ gives the highest peak on the race profile, and the maximum negative radius $R_{av}(y_i)_{min}$ gives the deepest trough in the race profile. Wear groove depth is therefore calculated and displayed to the operator as the peak-to-peak, i.e.:

$$\text{Wear Groove Depth}=|R_{av}(y_i)_{max}|+|R_{av}(y_i)_{min}| \tag{13}$$

For the linear race, the equation of the best fit line is determined using linear regression techniques:

$$y=a+bx \tag{14}$$

is the general equation of a straight line. Given n data points $(x_j, y_i)$, where i=1, 2, ..., n, the error at each point is:

$$E_i=y_i-a-bx_i \tag{15}$$

and the sum of squares of the errors is:

$$SSE = \sum_{i=1}^{n} (y_i - a - bx_i)^2 = \sum_{i=1}^{n} [E_i]^2 \tag{16}$$

To minimize the SSE, its partial derivatives with respect to a and b are set equal to zero.

$$\frac{\delta SSE}{\delta a} = -2\sum_{i=1}^{n} (y_i - a - bx_i) = 0 \tag{17}$$

$$\frac{\delta SSE}{\delta b} = -2\sum_{i=1}^{n} (y_i - a - bx_i) = 0 \tag{18}$$

Substitution leads to the final equations to solve for a and b.

$$b = \frac{n\Sigma xy - \Sigma x\Sigma y}{n\Sigma x^2 - (\Sigma x)^2} \tag{19}$$

$$a = \frac{\Sigma y - b\Sigma x}{n} \tag{20}$$

Resulting error analysis and output is performed for the linear case in a similar manner as for the circular case, however, errors are represented by deviations from the best-fit line.

The average maximum positive deviation from the best fit line $\text{Lav}(y_i)_{max}$ gives the highest peak on the race profile, and the average maximum negative deviation $\text{Lav}(y_i)_{min}$ gives the deepest trough in the race profile. The peak-to-peak result gives the wear groove depth:

$$\text{Wear Groove Depth} = |L_{av}(y_i)_{max}| + |L_{av}(y_i)_{min}| \qquad (21)$$

The usefulness of the peak-to-peak depth is based on the observation that wear groove can appear, under the microscope, to have material displaced from the center of the groove toward the edges. The effect is that the material is deformed on either side of the wear groove and forced upwardly to slightly above the nominal surface of the race. Since this raised area can be more readily removed during refurbishing of the race, it is useful to specifically identify the depth of the wear groove below the nominal surface, and ignore the raised portion.

Wear groove depth, therefore, is presently preferred to be displayed to the operator as nominal-to-minimum. In this case, the nominal profile is not the best-fit profile described above, but is the profile of the original geometry machined into the race. The "minimum" is the depth of the deepest trough. To obtain a best estimate of the original, or nominal profile, fitting is repeated using equations of the form (1) through (12) with inspection points ignored at the locations of the wear groove. These wear groove points are presumed to be inspection points which exhibit negative errors to the original best-fit profile. The wear groove depth is then calculated as the maximum deviation below the best-fit nominal profile, or nominal-to-minimum, and displayed to the operator.

The obtaining of a nominal profile by disregarding inspection points which exhibit significant negative errors with respect to the first best-fit profile, utilize a second regressive curve-fitting process, with the aforementioned inspection points ignored for purposes of finding the nominal profile. The rationale for this procedure is that, as the amount of wear becomes more significant, the first regressive curve-fitting technique will produce a fitted curve which is shifted toward the inspection points relating to wear grooves, so as to minimize the SSE error. In other words, the size of the defects pulls the fitted curve toward them and away from the nominal curve.

By using a so-called double regression, the first regression establishes a best-fit curve which allows the identification of the significant error points, the data is then selected to eliminate those data points from the next curve fitting, and the second regression produces the nominal profile from the inspection points which have the greatest probability of following that nominal profile. While this procedure requires a second pass on the data points, it does not produce an unacceptable delay, and the improvement in quantitative results in most cases will be found worth the cost of the slight additional processing. In terms of operation of the instrument, the slight additional delay in producing the final result is almost imperceptible to average user.

In order to state the foregoing process in somewhat more rigorous terms, using the nomenclature developed in the equations above, the following discussion can be referenced.

After r, h and k are determined by the first regressive curve-fitting process, a selection process is employed to identify certain data points which likely result from defects in the track. The selection process is used as a basis to eliminate those points from the second regressive curve-fitting process. The data points are not completely discarded, they are simply not used in the second regression.

The selection process uses the results of the first regressive curve fit. As a first step, the theoretical radius for each data point is computed:

$$r_j = \sqrt{[x_j - h]^2 + [y_j - k]^2} \qquad (22)$$

The respective radius errors for each data point are then determined:

$$E_{r_j} = r_j - r \qquad (23)$$

Following determination of all the errors, an index subset, m, is created:

$$m \subset j \qquad (24)$$

where:

$$m_q = j \text{ if } E_{r_j} > 0 \qquad (25)$$

Finally, the regression process using equations 10–12 is again applied with the following notation substitutions:

$$x = (x_{m_q}) \qquad (26)$$

$$y = (y_{m_q}) \qquad (27)$$

The summation index is defined as:

$$\Sigma = \sum_{l=0}^{q_{max}} \qquad (28)$$

with the value of $q_{max}$ varying for each individual data set sampled, and l is the index of x and y in the regression equations. The results of the second processing of equations 10–12 as described herein are signified as r', h' and k' to identify that they are the results of the second regression.

After the second regression is performed, the radius errors are determined for all data points:

$$r_j = \sqrt{[x'_j - h]^2 + [y'_j - k]^2} \qquad (29)$$

The respective errors are then determined:

$$E_{r_j} = r_j - r' \qquad (30)$$

When it is desired to display the maximum deviation, the maximum error is determined from the data set produced by equation 30, and that is displayed as the nominal-to-minimum error. Smoothing can be used between a selected number of data points, (such as 4 as noted above), in order to minimize noise and the like.

It will be noted at this point that more than a single data set can be utilized in determining deviations in the track being tested. Among the improvements in the measuring apparatus is the ability to produce two sequential data sets, each describing a complete traverse of the interface ball across the track, and to utilize both data sets in determining the nominal curve and errors from the nominal curve. Among the mechanical improvements which enhance the practicality of that approach are the means which prevent the race from rising from the table during traverse of the interface ball across a track. As will be described below, a small but strong magnet is located in the base near the support post, such that a race, once put in position, will not readily rise from the table, such as by force produced when the interface ball traverses the track from the bottom to the top.

With that means in place, the operating sequence can be readily altered to allow a dual traverse of the track, from bottom to top, then from top to bottom, and a recordation of two data sets. Those data sets are preferably maintained separate and processed independently, with the results being compared with each other as a check on validity of the measurement.

The equations which are computed are identical to those set forth above, and the only difference is the notation utilized to separately identify the data sets and the results produced from those data sets. However, one skilled in the art will now appreciate that the process can be utilized with a single traverse and double regression as described above, or can be modified to use a dual traverse, and a double regression technique applied to both data sets of the dual traverse to produce an indication of the nominal or best-fit track shape, and deviations from that shape.

Utilizing nomenclature like that set out in expressions 20 and 21 for a circular form race, the nominal-to-minimum result is given by:

Wear Groove Depth=$|R_{av}^{nom}(y_i)_{max}|$ where $R_{av}^{nom}(y_i)_{max}$ is the maximum negative radius error, giving the deepest trough in the race profile with respect to the nominal radius.

Similarly, for linear races the nominal-to-minimum wear groove depth is given by:

Wear Grovve Depth=$|L_{av}^{nom}(y_i)_{max}|$ where $L_{av}^{nom}(y_i)_{max}$ is the maximum negative deviation from the nominal best-fit line (i.e., the line with the wear groove ignored) giving the deepest trough in the race profile with respect to the nominal line.

Where the term "wear groove depth" or "groove depth" is used herein, it is intended to encompass both such measures. Thus, the peak-to-peak depth may be important in some circumstances, and is readily produced as described, for example, by expression (13). In other cases, for example, where it is intended to use refinishing techniques to remove high points, the groove depth in the form of a nominal-to-minimum measure is preferred. Both, as well as other measures described herein, are generically encompassed within the concept of determining or outputting a measure of the surface profile of the track.

It is presently preferred to output the groove depth as a measure of the profile of the surface being tested. It is expected that such a measure will provide the greatest amount of information in a relatively simple display, and can allow quantitative information to be correlated with CV joint operation to better establish actual numerical standards to guide the rebuilding operation. It is, of course, possible to display different, less or more information. For example, it is possible to establish a standard, such as 0.0005 inches, for maximum permissible deviation for a possible part, to perform an internal test for deviation, and to simply provide a go or no-go output indicating whether the part has passed or failed the test. Alternatively, it is possible to assign an arbitrary scale, such as 1 to 10, for the range of depths expected to be encountered, and simply to output a number on that arbitrary scale.

It is also useful, in some cases, to employ the communication aspects of the processor board 200 (FIG. 8) and a communication link 240 to output information to a connected personal computer 241 for display on the CRT associated with the personal computer. For example, the entire curve shape can be output on the communication bus 240 and displayed for analysis. The display can be in terms of digital counts measured by the encoder, or in actual increments of thousandths of an inch. Digressing briefly to FIG. 10, there is shown a plot of the type of display which might be provided, particularly in somewhat more sophisticated environments where it is desired not only to identify defective parts for replacement, but also to better understand the nature of the failure.

Figure 9:
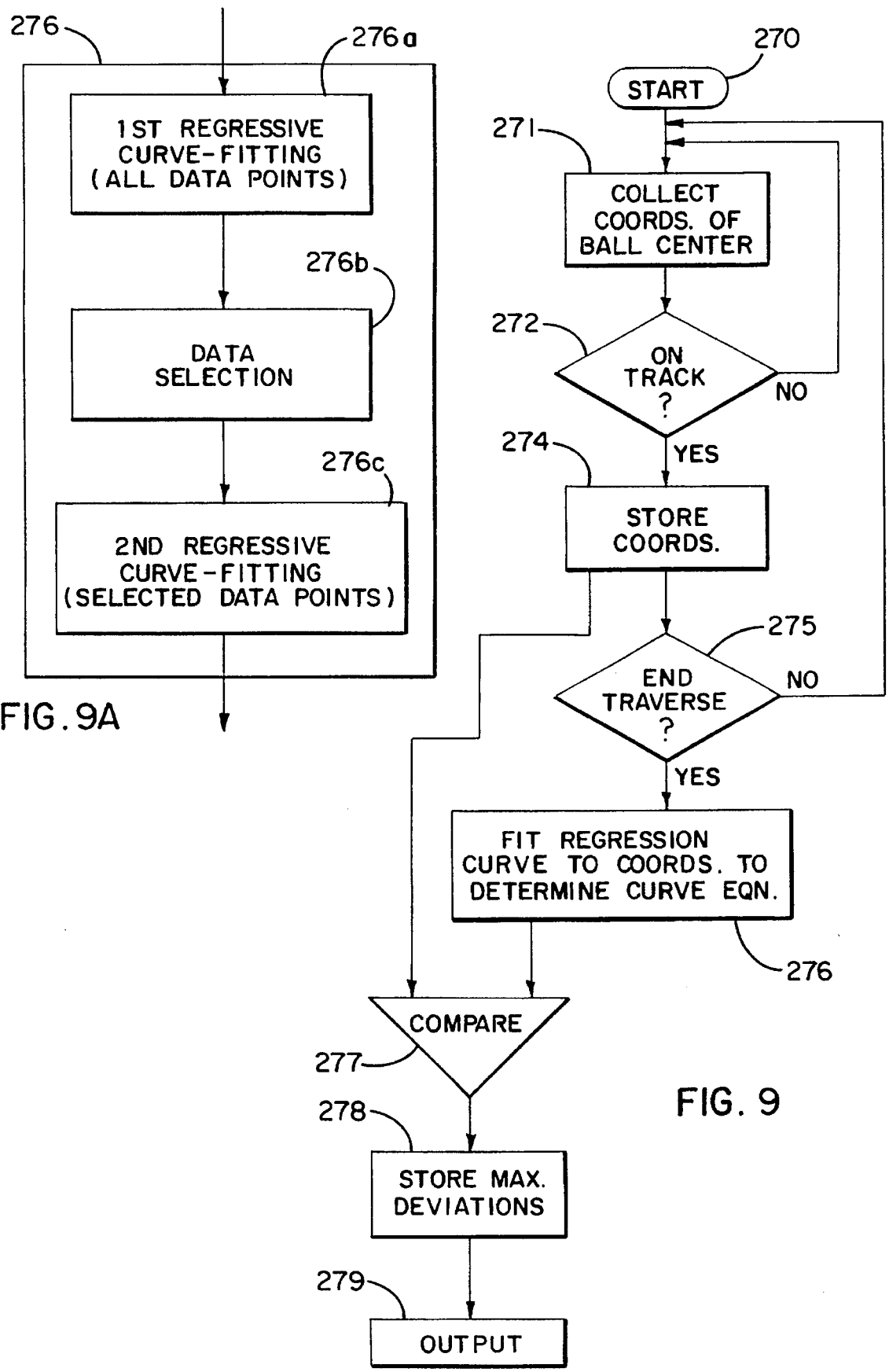
FIG. 9 is a flowchart illustrating the sequence performed by the processor in determining, from the measured set of positional data points, the expected shape of the measured track and deviations from that shape.

Turning then to FIG. 9, there is shown a sequence of steps performed by the apparatus illustrated in FIG. 3, et seq., utilizing the functional components illustrated in FIG. 8 for testing a race of a constant velocity joint and outputting a measure of the surface profile of the track which was tested. In preparation for beginning the sequence, it is of course necessary to load the race onto the table generally oriented with respect to the post, and to install a ball of compatible size in the follower. It is also necessary to indicate to the system a selection of whether a circular or linear race is being tested. In some cases, the length or approximate length of the traverse may also be entered. The sequence is then started, as by depressing the "Start" pushbutton, and the start of the sequence is indicated in FIG. 9 by the block labeled 270. As was described previously, the starting of the sequence causes the retract cylinder to be released, allowing the spring to pull the follower into contact with either the race being tested or the central post, depending on the nature of the test. When the follower is moved to its active position, the traverse of the table is commenced, and a step 271 initiated to begin the collection of coordinates of the ball center. It is recalled that the coordinates are recorded based on increments of traverse of the table and increments of deflection of the follower as the follower is deflected during the course of the traverse. A first test is performed at 272 to determine if the ball is on the track to be tested. It is recalled that, for example, for internal races, a traverse can commence with the ball on the upstanding portion of the shaft. If the ball has not yet encountered the track, the negative result from test 272 continues the traverse and the collection of coordinates, until the test 272 yields a positive result. That indicates that the ball is now on the track, and the coordinates being collected are those of the track. A step 274 is performed to store those sets of coordinates as they are collected. The storing operation continues by virtue of a test 275 until the traverse is completed. Prior to completion of the traverse, it will be seen that a negative result from the test 275 causes the collection and storage of further coordinates. At the end of the traverse, a positive result from a test 275 causes a step 276 to be performed to fit a regression curve to the coordinates which have been stored in order to determine the equation of the curve. Utilizing the two examples given above, either a circular regression curve or a linear regression curve is fit to the coordinates stored in step 274 to determine the equation for the curve in question. The step 276 can be the single regression sequence described originally, but is preferably the double regression sequence which first finds a best-fit curve from all of the data points, then selects the data points most likely relating to the nominal track profile, then determines the nominal track profile from that selected set of data points.

FIG. 9A illustrates an expansion of the step 276 for the double regression. In that case, the step 276 can be considered made up of three successively performed steps. A first, step 276a, performs the first regressive curve-fitting technique for all of the data points. A data selection step 276b is then performed to segregate the data points which most likely conform to the nominal track shape from those which most likely relate to defects in the track. A step 276c is then performed on the first selected group of data points, to produce a best-fit curve from the selected data points.

Having determined the equation for the curve, and thus the parameters of the curve, a step 277 compares the best fit curve, point by point, with the coordinates stored in step 274. It is parenthetically noted that "best-fit curve" when used here is intended to encompass both the best-fit curve determined from all of the measured points, and used to determine peak-to-peak deviations, and the nominal curve which excludes points around the wear groove, and is used to determine the nominal-to-minimum depth. Thus, "best-fit curve" is used in the generic sense of a curve which is determined by the system to fit all or some of the coordinates measured from a track of a race under test. The stored coordinates, potentially averaged as described above in order to remove noise, are compared on a sufficiently fine basis with the best fit curve in order to detect deviations from the best fit curve. Deviations which are detected are stored in a step 278. All deviations can be stored, or preferably only the maximum deviations which are then available for output as a measure of the profile of the track just tested. A step 279 is performed to output that result, typically in the form of a number indicating the maximum deviation of any groove found in the track.

In typical use, a race can be loaded onto the table, and a testing sequence commenced in a period of time on the order of 5–10 seconds. The steps illustrated in FIG. 9 can be performed in an equivalent amount of time, allowing an operator to determine, in a relatively simple and foolproof way, quantitative information about any defects in the race being tested in substantially less than a minute. It is found that not all tracks of a race need be tested, that if a race has a groove sufficient to render it defective, that groove will appear in all tracks. Thus, it is necessary for the operator to load the race with only one track in the operative position, then to run only one test of that track. Furthermore, the system is capable of deriving all of the information needed to test that track (and therefore the entire race) by a single traverse of the ball along that single track. Thus, in a period of 15 seconds or so, an operator has a positive indication of whether the race he has tested is useful in a rebuilding operation or should be scrapped and replaced with a rebuilt part.

In short, in a rebuild operation, an operator simply needs to disassemble and clean the parts. Those which are ordinarily replaced, such as ball cages, can be scrapped as in the ordinary course. Those which are normally reused in the majority of cases, such as the balls, can be retained for inclusion in the rebuild. Those which are sometimes replaced and sometimes not, and are quite expensive, such as the inner race and the outer race, are tested using the apparatus and procedure described above. If a test indicates the part is good, it can be used in the rebuild operation. If the test indicates that the part is only marginally bad, it might be buffed or polished, retested, and reused in a rebuild operation. If the test indicates that the groove is too deep for polishing, the part can be discarded and replaced with a replacement part for the rebuild operation. Thus, the joints can be reassembled making maximum use of parts from the original CV joint, but with assurance that all parts which are indeed defective have been isolated and are replaced.

As a subsidiary feature of the invention, it is also possible to determine the size of the drive balls used in these constant velocity joints. The balls are not often defective, so means are not provided in the present embodiment for determining their shape. However, the balls are sufficiently close in size, that it is useful to be able to associate a particular size with a given ball. Thus, in order to determine ball size, it is simply necessary to select the proper sequence from the menu, to insert the ball in question into measuring apparatus, then to press the "Start" button, following which ball size is automatically measured and displayed.

Figure 7A:
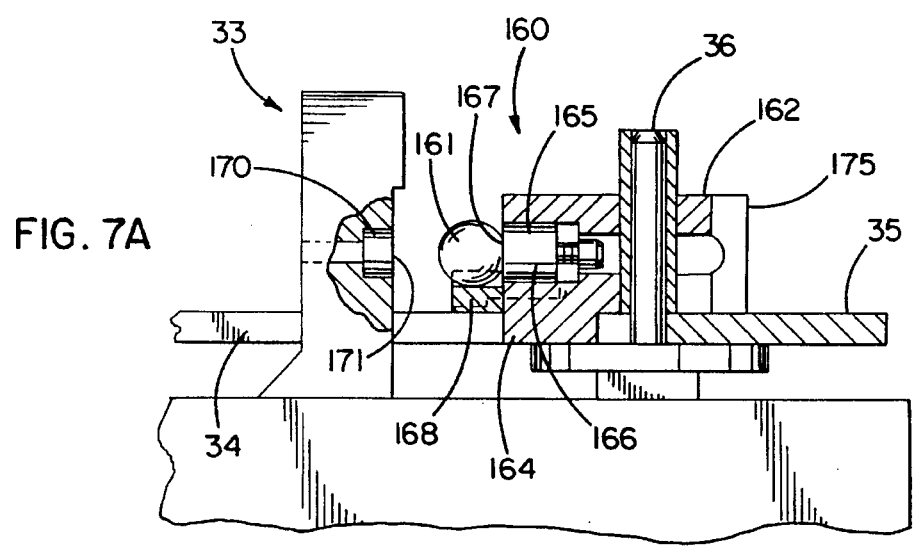
FIG. 7A is a partial diagram illustrating the use of the invention in determining the size of drive balls.

Referring to FIG. 7A, there is shown a ball holding fixture 160 used to support a ball 161 whose size is to be measured. The ball support 160 includes a block 162 adapted to be fit over the post 36 carried by the support table 35. A depending tab 164 fits inside the slot 34 of the table 35 to serve an anti-rotation function. A cylindrical socket 165 in the ball holding block 162 carries a magnet 166, preferably a high quality Alnico magnet. In contrast to the ball holding magnet on the follower arm, the magnet 166 has an accurately machined flat face 167. A V-shaped ball holder 168 is fixed to the face of the ball holding block 162 to form a horizontal self-centering seat for the ball, and the magnet 166 draws the ball to the block 162 to fix it in position when it is to be sized. The follower arm 33 is fit with a button 170 having a flat accurately machined face 171 adapted to contact the ball 161 as the follower 33 advances toward the post 36. The diameter of the button 170 is sufficiently large to accommodate the range of balls to be sized. Thus, when the "Start" button is depressed, the retract cylinder is released, and the translation cylinder is raised such that the button 170 is on about the center line of the ball positioned in the ball holding block 162 against the holding magnet 166. The follower arm advances toward the post 36 until the face 171 of the button 170 contacts the ball 161. The position of the arm is detected; the gauge had previously been calibrated such that the ball diameter (or radius) is accurately determined. The display then outputs the ball size, preferably both the nominal ball size (e.g., 9/16 inch) and the actual measured ball size (e.g., 0.5623 inches).

It is noted in passing that the block 162 can serve a dual purpose. Thus, if an accurately formed V 170 is machined in the face opposite the magnet 166, the block 162 can serve a dual function. Upon rotating the block 162 by 180 degrees and inverting the block 162 before replacing it on the post 36, the block 162 can also serve the function of the V-block 140 of FIG. 7.

Figure 10:
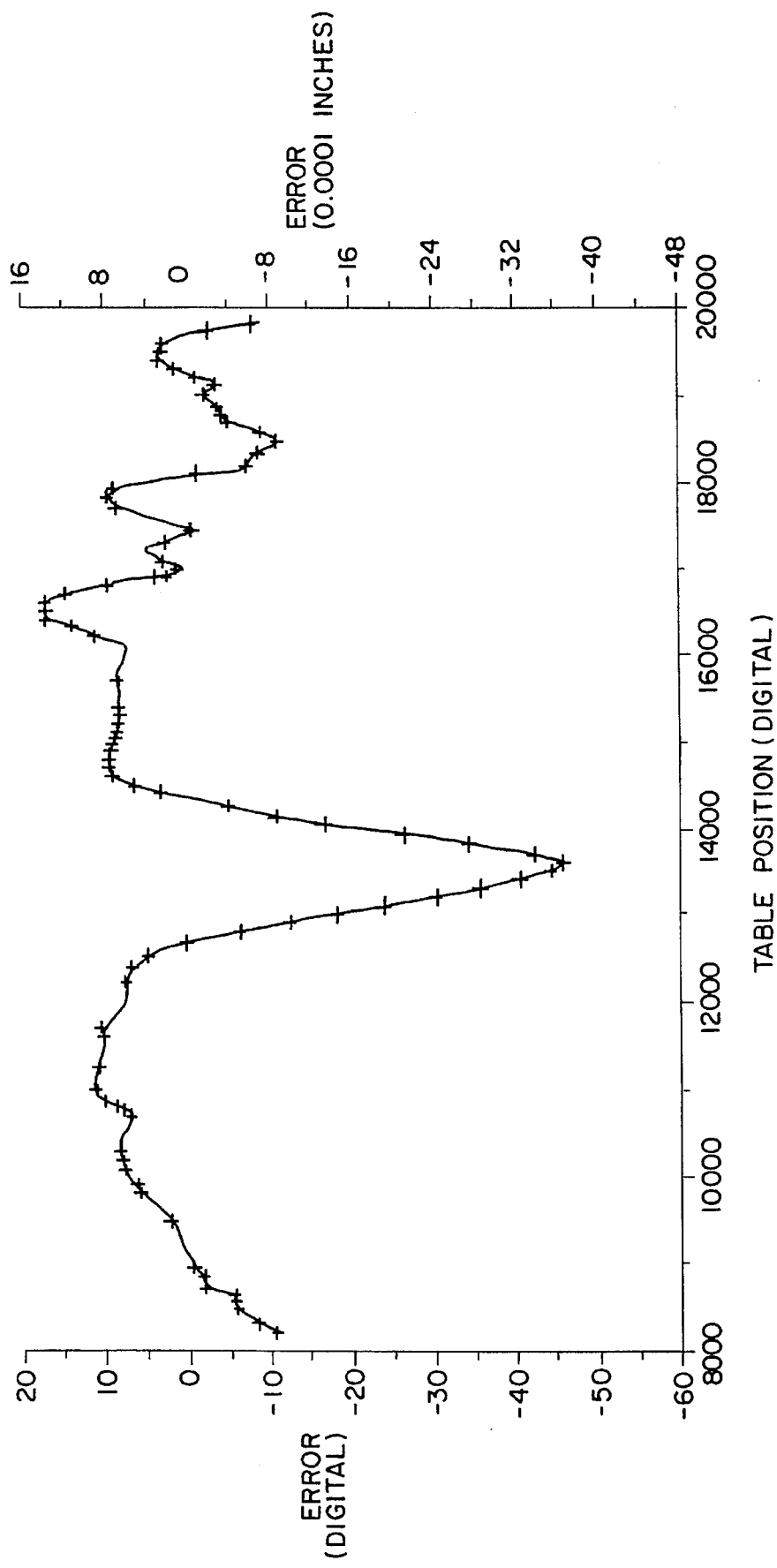
FIG. 10 is a plot of track surface showing deviations (from the nominal track shape), providing an indication of the sensitivity of the system.

Turning to FIG. 10, there is shown a sample of a set of measurements taken by an instrument constructed in accordance with the present invention, and tracing an inner race with a very substantial wear pattern. This is the type of display which can be produced on a personal computer 241 connected to the processor 200 by a communication link 241 as shown in FIG. 8. The scale across the bottom of the display shows the table position in absolute digital increments, running from 8,000 to 20,000. This represents only a portion of the entire track, and is in the nature of an enlargement intended for study of the shape of the defect. The left-hand scale shows the digital error from the normal position of the curve, referenced as zero. The zero reference can, of course, represent a circular trace whose digital coordinates will vary, and the zero of the graph of FIG. 10 is simply intended to indicate the baseline surface. The right-hand scale is intended to indicate error in increments of 0.0001 inches. The curve is substantially expanded to emphasize the wear mark, which is shown to be approximately 0.004 inches deep. This is a very substantial wear mark, and probably on the order of ten times the depth of a wear mark which would be adequate to cause a part to be scrapped. In other words, the system is adapted to find wear marks which are on the order of 1 or 2 ten thousandths of an inch, with the expectation that wear marks on the order of three or four ten thousandths of an inch are sufficiently serious to cause a part to be scrapped. In any event, the curve of FIG. 10 illustrates the ability of the system to determine deviations from the best fit curve also determined from the data. The maximum deviation finding technique set forth in connection with the foregoing description will then output on the display to the operator an indication of the maximum depth of the groove in FIG. 9, indicating to the operator quite clearly in this case that the part should be scrapped. But even in cases of wear grooves which are ten times shallower than that shown in FIG. 10, the system will be capable of quantifying those deviations, and displaying the quantified result so that an operator, even if when he cannot by feel or sight determine whether a groove is sufficiently deep to cause a part to be scrapped, will have a numerical go/no-go indication as to the seriousness of the defect encountered.

Figure 11:
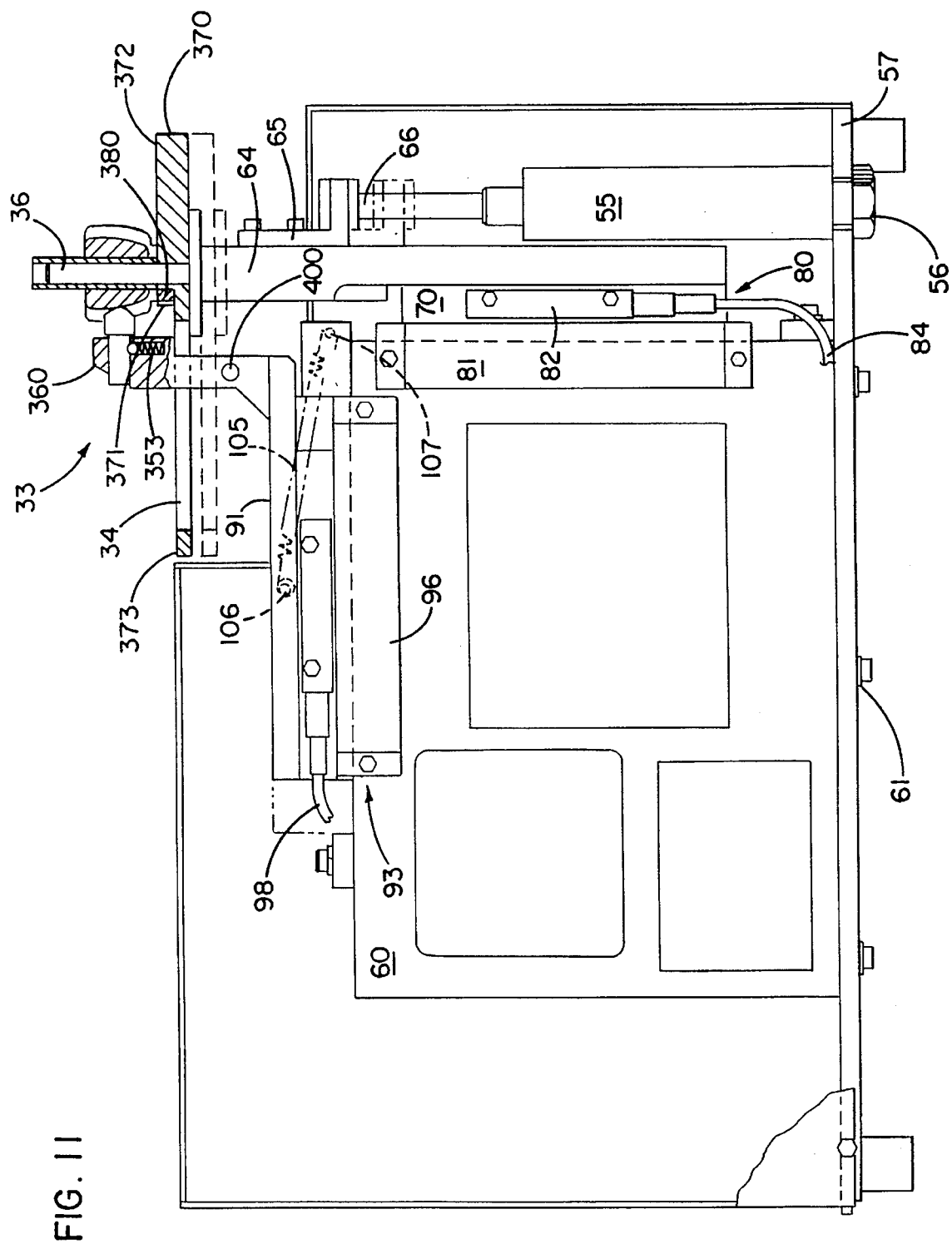
FIG. 11 is a front elevation, partly cut away, showing an embodiment similar to FIG. 3, and which is currently the preferred embodiment of the present invention.

The embodiment described thus far, and illustrated generally in FIG. 3, has had a number of refinements and improvements incorporated therein, and those improvements are illustrated in the embodiment of FIG. 11, which forms the currently preferred embodiment of the present invention. Among the improvements incorporated in the FIG. 11 embodiment are improvements in the interface ball. Specific improvements of the interface ball of compatible size relate to the use of an interface ball which increases the contact angle slightly (such as by use of a very slightly oversize ball) to gauge tracks in a location which experience has determined is particularly subject to wear. A further specific improvement in the interface ball is the relieving of the center of the ball (by removing material from the center), to prevent the ball from bottoming out when grooves or wear marks substantially reduce the contact angle to zero degrees. The particular configuration of the interface ball is facilitated by a different mounting arrangement.

Among other improvements are the elimination of the retract cylinder, and the provision of a hand retract feature which is found to improve the ergonomics and controllability of the system. The table on which the race is positioned is altered slightly, again to improve ergonomics and controllability. By virtue of these alterations, the outer race is dropped slightly, so that the interface ball can more readily contact the outer race at the beginning of a groove or track. A magnet is also associated with the table to more positively hold the race in place. This allows the provision for the two-pass operation mentioned briefly above. Finally, a holding block for outer races of a slightly different form is also disclosed.

Figure 12A:
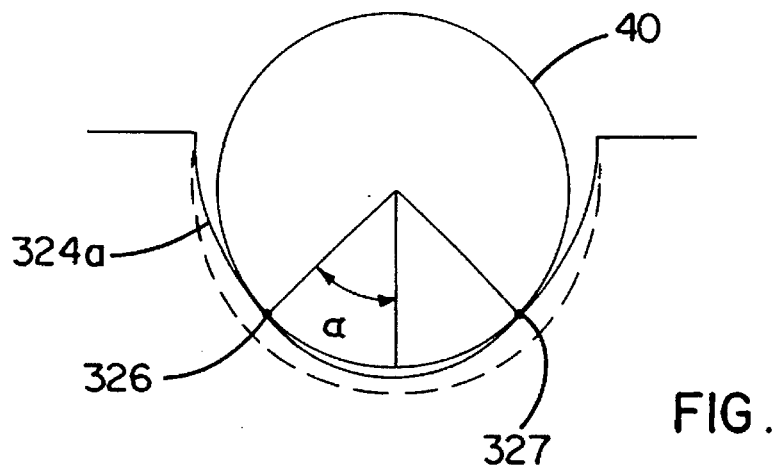
FIGS. 12A–12C are diagrams illustrating the engagement of a ball with an elliptical track and showing various contact angles between those elements.
Figure 12B:
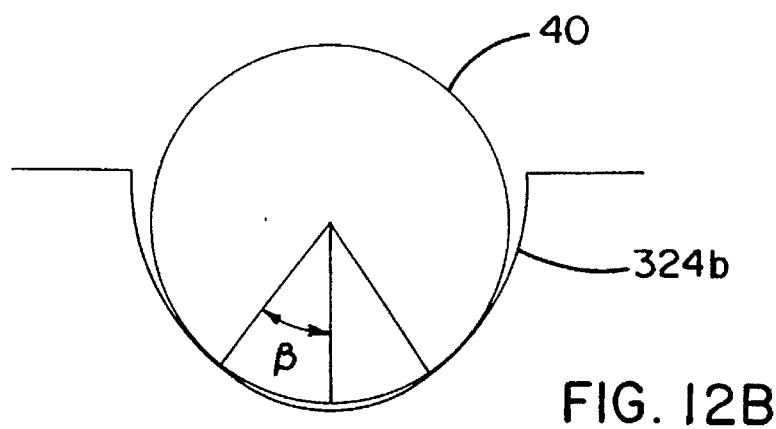
Figure 12C:
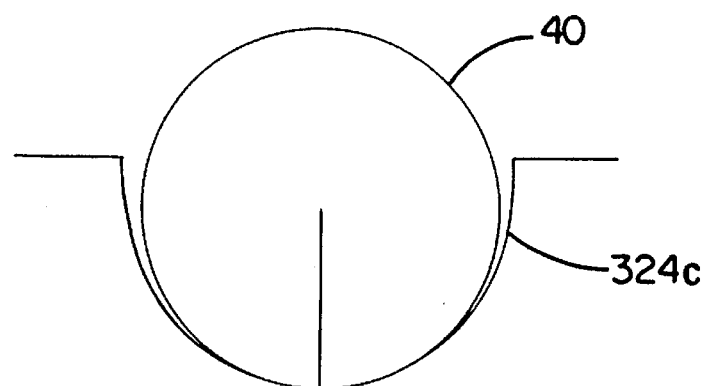

Referring first to the alterations in the interface ball, FIGS. 12A–12C are useful in understanding the change in contact angle which occurs at a significant wear groove. When a completely spherical ball is utilized to measure the wear groove, and the groove causes a significant change in contact angle, the change, in effect, attenuates the displacement of the follower, and thus the apparent measured depth of the groove. In effect, as the interface ball enters the wear groove, the ball begins to enter the groove but the contact angle also changes, so that a portion of the ball at a lesser contact angle is then in contact with the race.

Referring to FIG. 12A, there is shown an interface ball 40 which is spherical in shape riding in a track 324a of elliptical shape. A contact angle $\alpha$ is illustrated between the points of contact 326, 327 and the normal to the track. This is the typical configuration for a spherical ball 40 in an elliptical track 324a, and the relative sizes are adjusted to achieve the design contact angle $\alpha$, often 30° or 45°. However, when a groove is worn into the track, and the ball rides onto the portion of the track which is grooved, the ball drops into the groove and the contact angle reduces as is shown in FIG. 12B. The depth of the groove 324b in FIG. 12B is exaggerated for illustrative purposes. However, it will be seen that the contact angle reduces from the original design angle $\alpha$ of FIG. 12A to a much smaller angle $\beta$ of FIG. 12B. The result is that the deflection of the ball 40 when going from the FIG. 12A to the FIG. 12B position is somewhat less than the actual depth of the groove, by virtue of the change in contact angle. FIG. 12C illustrates a very severe condition where the reduction in contact angle produces a zero degree contact angle, in which the ball 40 contacts the track 324c at only a single point at the bottom of the track. It will be appreciated that in the severe wear condition of FIG. 12C, the ball 40 will not be measuring the depth of the groove at the normal contact angle, but instead will bottom out in the bottom of a track, and at best will measure the depth of the groove at the bottom of the track.

In effect, measurement of depth in this fashion can be considered to be somewhat artificial, if a "true" depth is considered to be the depth of the groove measured at any point at a normal to the surface. However, it is also found in practicing the invention that the deflection of the ball is a more practical measure of groove depth in that it is result-oriented in measuring how an actual drive ball will react when running in the track under test.

In order to lessen the effect of attenuation caused by the change in contact angle, it has been found that it is preferable to utilize an interface ball which creates a slightly larger than design sized contact angle, so that encountering a wear groove, while it will reduce the contact angle, does not significantly attenuate the depth measured by the instrument. As a further feature, it is found that the ball can be configured to provide a minimum contact angle which will not be substantially reduced, even in the presence of deep grooves, to further reduce attenuation.

Practicing these principles, it will be found that the tracking of the ball position as it traverses the groove is a reliable measure of groove depth in that it is both (i) macroscopic in that it can characterize travel in the groove along the groove, and (ii) repeatable. Thus, the adjustment of the contact angle and the relieving of the center of the interface ball to limit the minimum contact, provides a better measure of wear groove depth, not in the sense that it is more like a single microscopic depth measured normal to the surface, but better in the sense that it is more amplified or less attenuated, while still being repeatable.

In a number of tests performed thus far, it has been found using constant velocity joints with elliptical tracks, that wear is predominant on the sides of the ball groove, and is least at the bottom of the groove. Whether the design contact angle is 45° or 0°, it was found that the wear was deepest above the point of contact, typically at about a 60° angle. In situations where this phenomenon is likely to exist, we therefore prefer to utilize an interface ball which is very slightly larger than the drive ball used in the CV joint. The result is to slightly increase the contact angle, in an effort to achieve a contact angle which is approximately coincident with the expected point of maximum wear.

In practicing this aspect of the invention, we prefer to utilize an interface ball which is approximately 0.001 inches larger in radius than the drive ball normally used in the joint. Using the sizes typically encountered in constant velocity joints, the increase in radius of 1/1000 of an inch typically increases the contact angle by about 15°. Thus, if a joint is used which has a normal 45° contact angle, and an interface ball is used which is 0.001 inches larger than the normal drive ball, the interface ball can be expected to have a contact angle of about 60°, the location in the groove where maximum wear is expected. When a wear groove is encountered, the ball will drop down, and reduce the contact angle, and that will naturally achieve a certain amount of attenuation. However, the measurement has commenced at about the expected point of the deepest part of the groove, and therefore the readings will be as amplified as can readily be achieved.

A second aspect of the interface ball optimization deals with bottoming out (FIG. 12C) of the interface ball in cases of severe wear, and also with the measurement of races designed for 0° contact angle.

In practicing this aspect of the invention, we have modified the interface ball to relieve the center portion thereof, so that the interface ball always has a positive contact angle relationship with the groove, since the material which would normally be required for a 0° contact angle is removed. Referring briefly to FIG. 13D, there is seen a modified interface ball 340 riding within a groove 347. It will be seen that a slot 344 is formed in the contacting face of the interface ball, so that the contact angle cannot be reduced below the angle Θ. It will thus be appreciated that an interface ball as shown in FIG. 12D will not bottom, and even in the case of a race designed for 0° contact angle, will measure the wear grooves at a positive contact angle, which can be configured to be much closer to the expected location of maximum wear.

It is to be kept in mind that there is a significant degree of freedom in selecting contact angles and measurement scales, since experience within the measuring gauge itself will determine quantitative levels dividing acceptable from unacceptable. In other words, it is not so much that a "true" measure which scientists can agree is an accurate measure of the depth in some geometrical plane is important, but what is important is the fact that a measure is obtained which is not artificially attenuated by an operating difficulty, and which measures the tracks in the place where they are expected to wear. Thus, when tracks are expected to wear at about a 60° contact angle, as determined from tests or experience, the ball can be sized to normally ride at about that point, can have its center relieved, so that it will not bottom, and the apparatus will reliably and repeatably gauge all such tracks, so that they can be compared one with the other. If experience then dictates that the maximum wear in a particular kind of joint is at a different angle, the interface ball of compatible size can be configured to accommodate that angle, and a set of measurements prepared for it. So long as the equipment provided to the user provides a simple set of choices as to which interface ball to use with which type of joint and what magnitude of reading is acceptable or unacceptable, it does not matter whether a different type of measurement, taken with different techniques and different degrees of precision, would produce a different result. The "depth" as measured by this technique can be considered a true depth for all purposes of this instrument, and the results compared from joint to joint to make the types of rebuild decisions for which this instrument is intended.

Figure 13A:
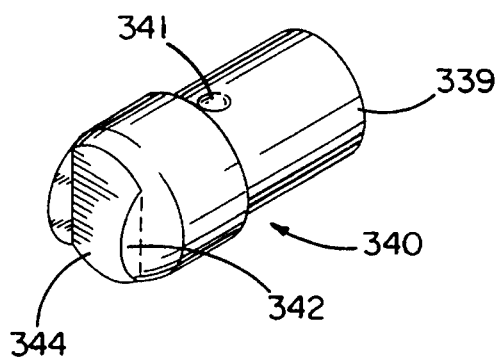
FIGS. 13A–13C are perspective, bottom and side views, respectively, of an interface ball according to the present invention which has a contact surface relieved at the central portion to prevent bottoming.

Turning to FIG. 13A, there is shown an interface ball 340 which is used in the presently preferred practice of the invention. The ball has a spherical surface 342 interned to ride within the track of a race to be measured. A groove 344 is formed in the center to relieve the central portion of the spherical surface 342, thereby to prevent bottoming. A shank 339 is provided opposite the spherical surface for mounting the interface ball in the follower which carries it. A small spherical depression 341 is formed in the shank 339 of the probe to serve as a key to maintain the appropriate orientation of the spherical surface with respect to a track under test.

Figure 13B:
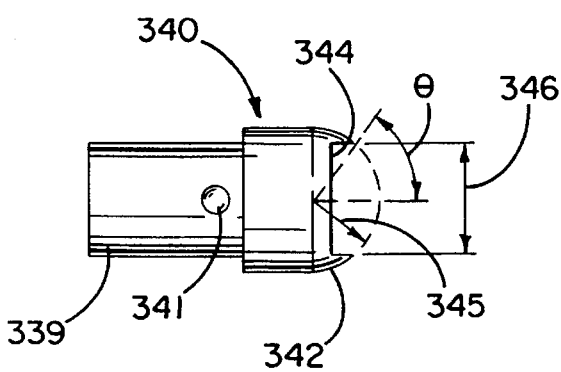
Figure 13C:
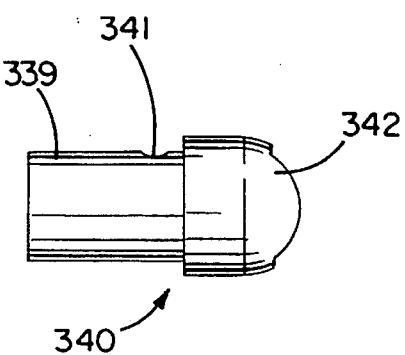
Figure 13D:
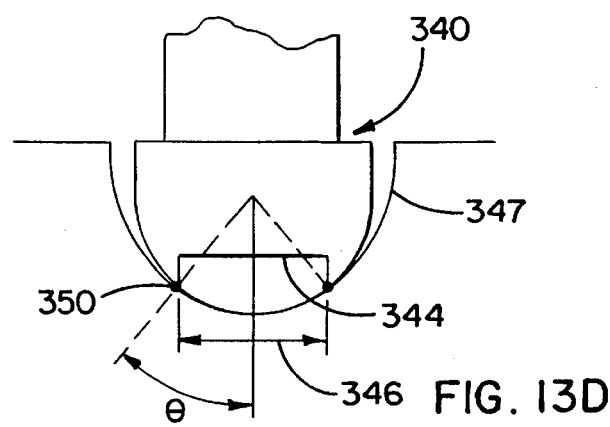
FIG. 13D is a cross-sectional view of an interface ball of the type illustrated in FIG. 13A engaging a track.

FIGS. 13B and 13C show the interface ball of FIG. 13A in plan and elevation, respectively. It will be seen from FIG. 13B that the relieved center formed by groove 344, has a width 346. Striking an arc, (indicated in radius 345) from the center of the spherical surface 342 to the edges of the groove 344 produces a minimum contact angle Θ which, for practical purposes, establishes a minimum contact angle in the track to be tested. That will be illustrated in FIG. 13D which shows the probe 340 inserted within an elliptical groove 347, and having contact points 350 at the edges of the groove 344. Normally, the interface ball would ride higher in the track 347, establishing a larger contact angle, and FIG. 13D shows the case of severe wear where the interface ball would otherwise bottom, but is restrained from doing so by virtue of the relieved center, and the minimum contact angle Θ maintained.

Figure 13E:
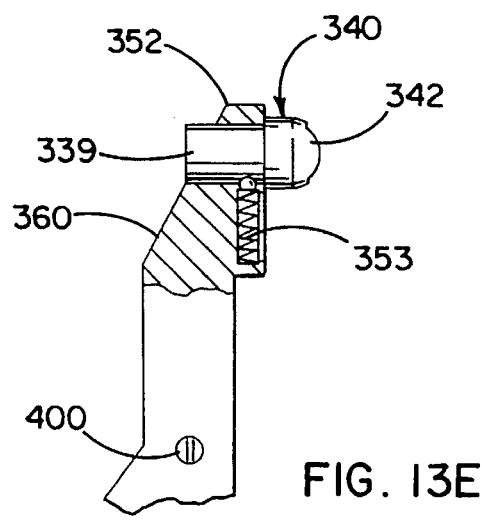
FIG. 13E is a partial view showing the mounting of the interface ball of FIG. 13A in the follower of FIG. 11.

FIG. 13E shows the interface ball 340 mounted within the follower 360 (FIG. 11). It will be seen that the shank 339 fits within an aperture in the follower, and a spring-loaded ball detent 353 engages the recess 341 to key the interface ball so that the groove 344 is perpendicular with respect to the track to be measured.

Figure 14:
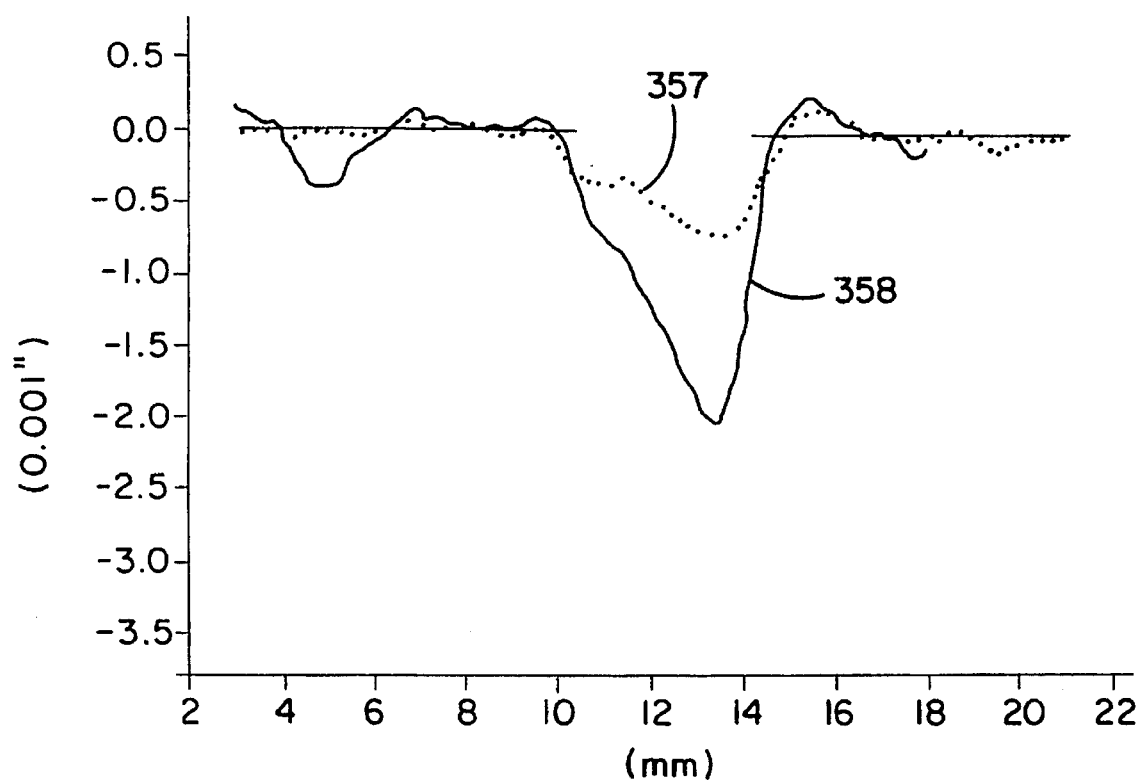
FIG. 14 is a plot of wear depth profiles of the same track measured with two types of interface balls.

On a new or a slightly worn race with elliptical groove, the wear depth profile measured with a modified interface ball of FIG. 13 is expected to be substantially less attenuated than that measured with a normal spherical interface ball. FIG. 14 illustrates the improvement which can be achieved. The dotted trace 357 shows the measurement of a wear groove using an ordinary spherical ball of the identical size normally used in the CV joint of the race being measured. The trace 358 shows the same groove measured with an interface ball such as that shown in FIG. 13A, which is approximately 0.001 inches larger in radius than the nominal design size, and which has the center relief. It will be seen that both instruments measure the wear groove which has a maximum at about the 14 millimeter mark. However, the measurement by the improved interface ball, as shown at 358, is much less attenuated than that achieved by the spherical ball shown at 357.

Turning again to FIG. 11, there will be described certain additional modifications with respect to the FIG. 3 embodiment. It will be seen that the FIG. 3 and FIG. 11 embodiments are very substantially similar, and like parts have been provided with like reference numerals.

Figure 15:
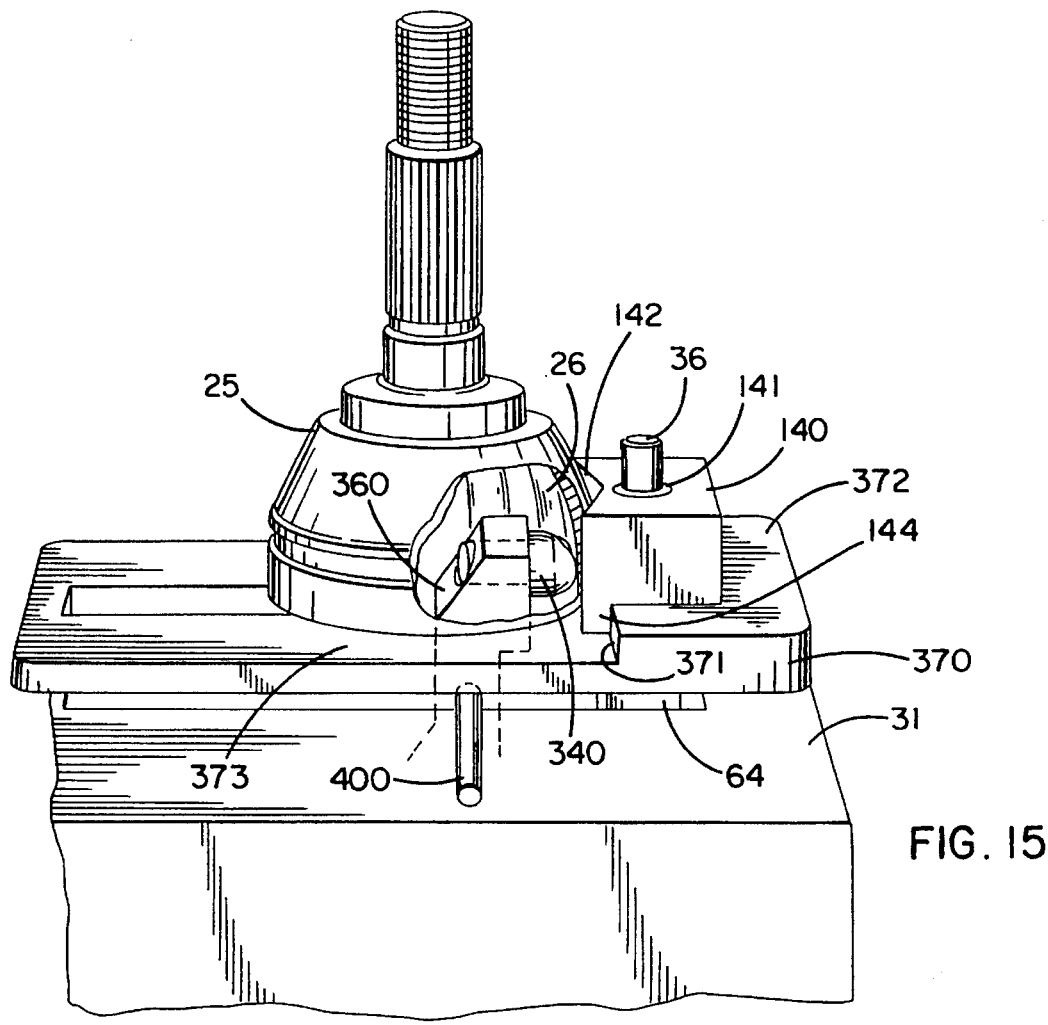
FIG. 15 is a partial diagram illustrating the use of the system with an outer race having internal tracks.

Among one of the alterations, however, is the elimination of the retract cylinder 100 from the FIG. 3 embodiment. As in the FIG. 3 embodiment, the follower 33 has a spring 105 which forces the interface ball into the track of the race being tested. However, to free the follower from the track, rather than utilizing an automatic retract cylinder as in the FIG. 3 embodiment, the system of FIG. 11 is hand operated. A rod 400 is secured in a lower portion of the follower, and as shown in FIG. 15, projects beyond the table 370. In order to install a race in the system of FIG. 11, the operator simply engages the rod 400 with a finger, withdraws the follower an adequate distance to slide a race over the post 36, then allows the follower to move forward under the tension of spring 105 until the interface ball engages the track to be tested. This greater degree of operator control is believed to be an advantage.

A second altered feature of the FIG. 11 embodiment is the interposition in the table 370 of means for positively restraining a race to be tested on the surface of the table. In the illustrated embodiment, that means is shown as a small but powerful magnet 380 fixed in an aperture in the table 370, so that it positively attracts a race 38 when positioned on the table.

With the magnet securely holding the race in position, it is now possible to reliably perform a two-pass measurement on a track to be tested. The follower is brought forward to engage the track while the table is in its topmost position.

After the interface ball is engaged in the track, the start button is depressed. The table then translates downwardly so that the interface ball rides from the bottom to the top of the track. In the case where an operator has input the approximate length of the track, at the end of the expected cycle, the table stops, then reverses direction to return to the upper position. A second series of measurements is taken as the interface ball then traverses the track from top to bottom. Those two sets of data are processed independently, with the results being compared with each other as a check on validity of the measurement as described above, to give a more accurate measure of the surface profile of the track and a measure of defects in that profile.

It will also be seen that the table 370 of the FIG. 11 embodiment has a two-level top, as opposed to the completely flat top of the earlier embodiment. An upper level 372 is provided at the post 36, and a lower level 373 near the follower 33. Thus, the follower has better access to the lower portion of the track at the start and finish of a measurement, when the interface ball is at the lower portion of the track.

The two-level table is particularly significant when measuring outer races, as will be appreciated with reference to FIG. 15. An interface block 140 of somewhat modified construction is positioned over the post 36. Depending legs 144 engage the vertical face 371 between the two levels 372, 373 of the table. Thus, the interface block is positively keyed with respect to the table, so that the V 142 formed therein is normal to the translation direction of the follower. The outer race 25 is positioned on a lower surface 373 of the table, such that when the operator whose hand engages the rod 400 allows the follower to come forward, the interface ball 340 engages the track of the inner race at about the beginning of the track and above the lip normally encountered in outer races. The start button is then depressed and a normal sequence occurs in which the table first translates downwardly to the maximum length of the track, during which traverse a set of data is taken showing the coordinates of the interface ball 340 as it traverses the track under test. At the top of the track, the table is stopped, and reversed, so that the table then moves upwardly, causing the ball to traverse the track from top to bottom. When the system returns to the position shown in FIG. 15, the second traverse is completed, and two sets of data are available for determining the surface profile of the track that had been tested and any defects in that track.

It is noteworthy that using the modified system for inner races as shown in FIG. 11 and outer races as shown in FIG. 15, at the start of the sequence, the interface ball is already in contact with one end of the track under test. Thus, there is no need for the system to determine a start of the track, since the operator has accomplished that during the setup. It is only necessary to determine the end of the track, and that has been found to be most conveniently done, by allowing the operator to input the approximate length of the track, which determines the stroke of the table, and thus the length of the track which will be measured.

Figure 16:
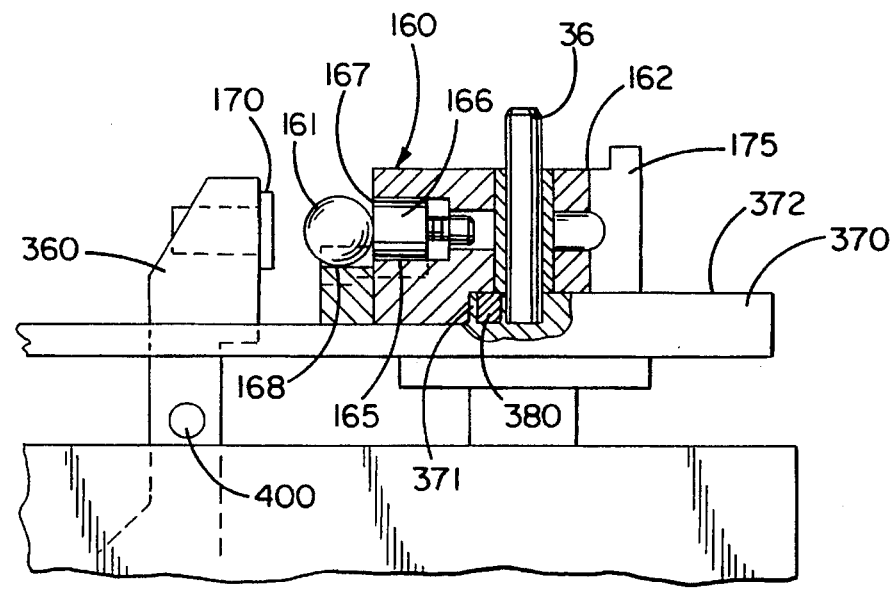
FIG. 16 is a partial diagram illustrating the use of the invention in determining the size of drive balls.

FIG. 16 shows a somewhat modified arrangement for measuring the size of drive balls. It utilizes a modified block 160 which can have the features of the block 140 (FIG. 15) on one face thereof, and which can be inverted and rotated to the position shown in FIG. 16, for sizing of drive balls. The fixture of FIG. 16 is substantially the same as that shown and described in connection with FIG. 7A except that it is built on a fixture 160 which preferably also has the V fixture 140 formed on one side thereof. As will be appreciated from FIG. 16, the fixture 160 has a back surface 175 which can be brought into position when the fixture is inverted and rotated, such that a V notch (not shown) in the side 165 serves the function of the block 140 of FIG. 15. When in the position illustrated in FIG. 16, the fixture 160 presents a magnet 166 and support 168 as described in connection with FIG. 7A, which cooperate with a flat follower 170 positioned in the follower arm, and adapted to measure the size of balls 161 placed in the fixture.

It will thus be apparent that what has been provided is a simple-to-use gauge which can accurately determine the depth of grooves in the profile of tracks of a constant velocity joint which are less than one thousandth of an inch in depth. The system is easy to use in that the race need only be positioned on the table without the necessity for precision alignment of the race with respect to fixed axes or the like. In the preferred embodiment, the user is allowed to select between a linear or circular race to be tested, following which the device automatically sequences through a measuring cycle. After the measurement cycle is initiated, the translation cylinder is actuated to begin a translation of the race past the follower. A sequence of x and y coordinates are derived as the interface ball traverses the track. Those coordinate sets are utilized in a least squares regressive curve-fitting sequence to determine the shape of the curve of the track being traversed and subsequently to determine deviations from that shape. The maximum deviation is recorded and output to the user to provide a quantitative indication of the depth of any grooves encountered in the track. The sequence of measurement is relatively rapid, and after the part is loaded and appropriate ball put in position, a measurement sequence can be accomplished in 10 seconds or less. The curve fitting is accomplished in real time during the sequence of measurement such that after the traverse of the ball in the track is completed, the maximum deviation is displayed to the operator almost instantaneously. Repeat measurements can be taken without undue effort, and the device is sufficiently foolproof that it can be used by an automotive technician or equivalent in a reliable fashion to produce better decisions than have been achievable heretofore in the rebuilding of constant velocity joints.

What is claimed is:

1. An electronic gauge for constant velocity joints;

the constant velocity joints being of the type having an inner and an outer race, the races having complementary ball tracks of precise profile into which are fit drive balls compatible in size with the tracks to closely couple the inner and outer races to produce a constant velocity universal joint relationship between the inner and outer races;

the electronic gauge comprising, in combination:

a support carrying a stop for locating one of the inner and outer races of a constant velocity joint with a track to be tested in an operative position;

a follower mounted for movement along a deflection axis generally perpendicular to the stop;

the follower having means for mounting an interface ball of a size compatible with the track under test, means biasing the follower toward the stop so that the interface ball engages the track under test and serves as an interface for the follower;

means for producing relative translation between the support and the follower along a translation axis to cause the ball to traverse the track from substantially one end to the other;

position indicator means coupled to the follower for producing signals related to deflection of the follower along the deflection axis during the traverse; and a processor for receiving and processing the signals to produce a measure of the surface profile of the track.

2. The combination as set forth in claim 1 wherein the constant velocity joint has a nominal contact angle between the drive balls and the respective tracks of the races, and wherein the interface ball of a size compatible with the track under test has the diameter thereof selected to provide an increased nominal contact angle between the interface ball and the track under test for wear measurement.

3. The combination as set forth in claim 2 wherein the interface ball is relieved in the range around zero degrees contact angle to prevent bottoming while measuring the surface profile of the track at small contact angles.

4. The combination as set forth in claim 1, wherein the constant velocity joint has a nominal contact angle between the drive balls and the respective tracks of the races, and wherein the interface ball is relieved in the range around zero degrees contact angle to prevent bottoming while measuring the surface profile of tracks at small contact angles.

5. The combination as set forth in claim 1 wherein the constant velocity joint has a nominal contact angle between the drive balls and the respective tracks of the races, and wherein the interface ball has a relieved center to establish a minimum contact angle of about 45° between the interface ball and a track under test.

6. The combination as set forth in claim 1 wherein the position indicator means comprises a first position indicator for producing signals related to the relative translation along the translation axis, and a second position indicator for producing signals related to deflection of the follower along the deflection axis.

7. The combination as set forth in claim 6 wherein the position indicators comprise linear optical encoders.

8. The combination as set forth in claim 6 further including a first precision linear bearing for mounting and constraining the support for translation along the translation axis, and a second precision linear bearing for mounting and constraining the follower for movement along the deflection axis.

9. The combination as set forth in claim 8 further including a linear actuator for translating the support along the translation axis, the biasing means for the follower including spring means for maintaining the interface ball in contact with the track under test during the translation, so that deflection of the follower is a measure of movement of the center of the interface ball as the ball traverses the track.

10. The combination as set forth in claim 8 further including means for retracting the follower to an inoperative position to allow the locating of a race in an operative position on the support.

11. The combination as set forth in claim 6 wherein the signals define a progression of (x, y) positional data points for the center of the interface ball as the ball traverses the track, and the processor includes a regressive curve fitting sequence adapted to fit the sets of data points to a best-fit curve, and means for comparing the coordinates of the data points to the best-fit curve to determine track defects in terms of deviations from said best-fit curve.

12. The combination as set forth in claim 11 wherein the regressive curve-fitting sequence is a double regression including a first regressive curve fitting sequence which determines a first fitted curve using substantially all data points, a data selection which selects data points by comparing the data points to the first fitted curve, and a second regressive curve fitting sequence which determines a second fitted curve using only the selected data points, the second fitted curve being used as the best-fit curve for determining track defects.

13. The combination as set forth in claim 11 wherein the best-fit curve is an arc of a circle of unknown radius and center before the regressive curve-fitting sequence is performed, and the regressive curve-fitting technique is a circular regression adapted to define the curve by the data points.

14. The combination as set forth claim 11 wherein the best-fit curve is a straight line, and the regressive curve-fitting technique is a linear regression adapted to define a straight line surface for the track.

15. The combination as set forth in claim 11 further including display means for displaying the maximum deviation between the coordinates of the data points and the best fit curve as the measure of the surface profile of the track.

16. The combination as set forth in claim 1 wherein the position indicator means are a pair of linear optical encoders, a first encoder measuring the relative translation between the support and the follower along the translation axis, a second encoder measuring the deflection of the follower along the deflection axis, the processor receiving signals from the optical encoders and obtaining sufficient positional data points during a traverse along a single track to determine the measure of the surface profile of the track of the race being tested.

17. The combination as set forth in claim 16 wherein the means for producing relative translation produces two traverses of the interface ball across the track, the processor receiving two sets of signals from the optical encoders, and producing two sets of positional data points to measure the surface profile of the track under test.

18. The combination as set forth in claim 1 wherein the support comprises a table and the stop comprises an upstanding generally cylindrical post for receiving a central opening in a race to be tested, the upstanding post being of a diameter capable of loosely receiving the race to be tested, and the biasing means for the follower being of a magnitude sufficient to move the race against the upstanding post to bring the track to be tested into an operative relationship with the interface ball.

19. The combination as set forth in claim 18 wherein the gauge is adapted to test an outer race having tracks on the interior thereof, the support being adapted to receive and fix an outer race in position.

20. The combination as set forth in claim 18 wherein the table has upper and lower levels separated by a step, and wherein an inner race to be tested is seated on the upper level, and an outer race to be tested is seated on the lower level.

21. The combination as set forth in claim 20, wherein a magnet is embedded in the upper level of the table between the step and the post for positively attracting an inner race under test.

22. The combination as set forth in claim 18 wherein the support further includes a linear drive for translating the table between an upper and a lower position to produce the relative translation between the support and the follower.

23. The combination as set forth in claim 1 wherein the mounting means of the follower comprises means for releasably securing the interface ball to the follower in such a way as to cause the interface ball to engage the track under test in an predetermined orientation.

24. An electronic gauge for races having tracks of the type engaged in operation by drive balls of compatible size which closely fit in the tracks, the tracks having complex profiles potentially carrying defects in the profile, the gauge comprising, in combination:

a support for fixing the race with the track in an operative position which is dimensionally undetermined with respect to any reference in the gauge;

a follower carrying an interface ball of compatible size adapted to traverse the track from end to end, causing deflection of the ball as the ball traverses the track;

means for measuring the deflection of the interface ball as it traverses the track from end to end to produce a sequence of coordinates defining the path of the interface ball;

means for performing a curve-fitting regression on the coordinates to define the parameters of a best-fit curve for the coordinates; and means for comparing the coordinates with the best-fit curve to determine deviations from the best-fit curve as a measure of any defects encountered in the traversed track.

25. The combination as set forth in claim 24 wherein the drive balls engage the tracks at a nominal contact angle in normal operation, and the interface ball of compatible size is sized to provide an increased nominal contact angle between the interface ball and the track under test for wear measurement.

26. The combination as set forth in claim 25 in which the interface ball has a relieved center portion to establish a minimum contact angle for contacting the track under test.

27. A method of determining the depth of imperfections in the surface of a track on a race intended to carry a drive ball of compatible size, the race being selected from a group of races of different curvature, the method comprising the steps of:

positioning the race on a support in such a way that the curve is fixed with respect to the support but is dimensionally undefined with respect to the gauge;

examining the surface of the track by measuring deflection of an interface ball of compatible size to the track as the ball is caused to traverse the track;

producing as a result of the examination step a succession (x, y) coordinates defining the position of the center of the ball as the ball traverses the track;

processing the set of coordinates with a regressive curve-fitting technique to minimize any errors between the coordinates and points on a reference curve whose shape and orientation are determined by the regressive curve-fitting technique; and identifying deviations between the coordinates and the determined curve as measures of the depth of any defects in the surface of the track.

28. The method as set forth in claim 27 wherein the step of examining the surface includes producing relative translation between the race and a follower carrying the interface ball to produce a sequence of coordinates of the center of the ball as it traverses the track during the relative translation.

29. The method as set forth in claim 27, wherein the regressive curve fitting technique is a double regression comprising the step of performing a first regressive curve fitting using all data points to determine a first fitted curve, comparing the data points to the first fitted curve and selecting certain data points according to predefined criteria to eliminate data points which deviate substantially from the first fitted curve, performing a second regressive curve fitting using the selected data points to generate a second fitted curve which is used as the reference curve.

30. The method as set forth in claim 27 in which the race has a curvature defined by the arc of a circle of undefined radius and center, the step of processing including performing a circular regressive curve-fitting sequence to define a best-fit circular arc to the set of coordinates.

31. The method as set forth in claim 30 wherein the step of identifying deviations comprises comparing the best-fit radius of the best-fit curve to an empirical radius determined from the coordinates to identify deviations between the coordinates and the determined curve.

32. The method as set forth in claim 27 in which the step of producing comprises taking the outputs of a pair of linear transducers to produce a sequence of (x, y) coordinates relating to the deflection of the ball by the track as the ball traverses the track.

33. The method as set forth in claim 27 wherein the drive ball has a nominal contact angle for engagement with the surface of the track during normal operation, and wherein the step of examining the track traverses the track with an interface ball of a size compatible with the track under test having the diameter thereof selected to provide an increased nominal contact angle between the interface ball and the track under test for wear measurement.

34. The method as set forth in claim 33 wherein the interface ball is relieved in the range around zero degrees contact angle to prevent bottoming while the ball is caused to traverse the track in the step of examining the track.

35. A method for automatically gauging the surface profile of tracks of constant velocity joints;

the constant velocity joints being of the type having an inner and an outer race, the races having complementary ball tracks of precise profile into which are fit drive balls compatible in size with the tracks to closely couple the inner and outer races to produce a constant velocity universal joint relationship between the inner and outer races;

the method comprising the steps of:

mounting one of the inner and outer races of a constant velocity joint with a track to be tested in an operative position;

engaging a follower with the track by means of an interface ball of a size compatible with the track under test, the engagement biasing the follower such that the interface ball engages the track under test;

producing relative translation between the race and the follower along a translation axis to cause the ball to traverse the track from substantially one end to the other;

monitoring the position of the follower during the traverse to produce a sequence of coordinates defining the center of the interface ball as the ball traverses the track;

processing the sequence of coordinates to determine a best-fit curve for the coordinates; and comparing the coordinates with the best-fit curve to determine deviations from the best-fit curve as a measure of the surface profile of the track.

36. The method as set forth in claim 35 wherein the constant velocity joint has a nominal contact angle for engagement between the drive balls and the tracks in normal operation, and wherein the step of engaging a follower with the track by means of an interface ball utilizes an interface ball which provides an increased nominal contact angle between the interface ball and the track under test.

37. The method as set forth in claim 36 wherein the step of engaging a follower with the track by means of an interface ball utilizes an interface ball having a relieved center to establish a minimum contact angle between the interface ball and the track under test.

38. The method as set forth in claim 35 wherein the steps of processing the sequence of coordinates to determine a best-fit curve utilizes a double regression technique which produces a first regression curve from all of the data points, selects those data points which best fit the first regression curve, and produces the best-fit curve from a second regression using the selected data points.

39. A method of rebuilding constant velocity joints utilizing existing parts which have tested good and replacement parts for those which have tested bad;

the constant velocity joints being of the type having an inner and an outer race, the races having complementary tracks of precise profile into which are fit drive balls compatible in size with the tracks to closely couple the inner and outer races to produce a constant velocity universal joint relationship between the inner and outer races;

the method comprising the steps of:

positioning one of the inner and outer races of a constant velocity joint for testing on a support to locate a track on the race for testing;

providing a follower capable of movement along a deflection axis toward or away from the track under test;

fitting the follower with an interface ball of compatible size and engaging said ball in the track under test as an interface between the follower and the track under test;

producing relative translation between the support and the follower along a translation axis to cause the ball to translate from one end of the track under test to the other, concurrently measuring deflection of the follower along the deflection axis as a measure of the profile of the track under test;

processing the profile measurements to determine if the track under test is bad or good; and rebuilding the constant velocity joint using races which have tested good and replacement parts for races which have tested bad.

* * * * *